US012380828B2

(12) United States Patent
Wen et al.

(10) Patent No.: US 12,380,828 B2
(45) Date of Patent: Aug. 5, 2025

(54) MODIFIED DEMURA ALGORITHM FOR DISPLAY PANELS

(71) Applicant: GOOGLE LLC, Mountain View, CA (US)

(72) Inventors: Chien-Hui Wen, Cupertino, CA (US); Hsin-Yu Chen, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/722,975

(22) PCT Filed: Dec. 22, 2021

(86) PCT No.: PCT/US2021/073067
§ 371 (c)(1),
(2) Date: Jun. 21, 2024

(87) PCT Pub. No.: WO2023/121684
PCT Pub. Date: Jun. 29, 2023

(65) Prior Publication Data

US 2025/0087126 A1 Mar. 13, 2025

(51) Int. Cl.
*G09G 3/30* (2006.01)
*G09G 3/20* (2006.01)
*G09G 3/36* (2006.01)

(52) U.S. Cl.
CPC ... *G09G 3/2003* (2013.01); *G09G 2320/0233* (2013.01); *G09G 2320/0242* (2013.01);
(Continued)

(58) Field of Classification Search
CPC ......... G09G 3/2003; G09G 2320/0233; G09G 2320/0242; G09G 2320/0673; G09G 2320/0693
See application file for complete search history.

(56) References Cited

U.S. PATENT DOCUMENTS 6,064,382 A 5/2000 Diedrich et al.
6,862,022 B2 3/2005 Slupe
(Continued)

FOREIGN PATENT DOCUMENTS

CN 102812509 B 3/2016
CN 105895051 A 8/2016
(Continued)

OTHER PUBLICATIONS

International Property India, First Examination Report mailed on Apr. 13, 2023, issued in connection with Indian Patent Application No. 20234700173, 5 pages.
(Continued)

*Primary Examiner* — Sanghyuk Park
(74) *Attorney, Agent, or Firm* — McDonnell Boehnen Hulbert & Berghoff LLP

(57) ABSTRACT

An example method includes measuring, from a device having a display panel, a plurality of luminance values for a plurality of pixels located along a cross-section of the display panel. The method includes selecting, based on the measured luminance values, a target luminance value. The method includes determining a luminance compensation profile for the input gray level at the given refresh rate. The luminance compensation profile comprises ratios of the measured plurality of luminance values to the target luminance value. The method includes storing, at the device, the luminance compensation profile. Subsequent to the storing, the device is configured to adjust input display data using the luminance compensation profile for an input gray level when the display panel is providing a display. The luminance compensation profile maintains a color uniformity of the display.

20 Claims, 11 Drawing Sheets

(52) U.S. Cl.
CPC ............... *G09G 2320/0247* (2013.01); *G09G 2320/0673* (2013.01); *G09G 2340/0435* (2013.01); *G09G 2360/144* (2013.01); *G09G 2360/16* (2013.01)

(56) References Cited

U.S. PATENT DOCUMENTS

| | | | | |
|---|---|---|---|---|
| 9,361,856 | B2 | 6/2016 | Jiang | |
| 9,501,993 | B2 | 11/2016 | Nambi et al. | |
| 9,620,064 | B2 | 4/2017 | Albrecht et al. | |
| 9,847,056 | B2 | 12/2017 | Shimizu et al. | |
| 11,189,222 | B1 | 11/2021 | Aogaki et al. | |
| 11,854,452 | B2 | 12/2023 | Wen et al. | |
| 2002/0051121 | A1 | 5/2002 | Kanai | |
| 2003/0001810 | A1 | 1/2003 | Yamaguchi et al. | |
| 2003/0016215 | A1 | 1/2003 | Slupe | |
| 2006/0146008 | A1 | 7/2006 | Johnson et al. | |
| 2008/0117142 | A1 | 5/2008 | Lin et al. | |
| 2008/0284720 | A1* | 11/2008 | Fukutome | G02F 1/13454 349/116 |
| 2009/0058763 | A1 | 3/2009 | Doi et al. | |
| 2012/0019494 | A1* | 1/2012 | Lum | G09G 5/10 345/207 |
| 2012/0056911 | A1 | 3/2012 | Safaee-Rad et al. | |
| 2013/0147857 | A1 | 6/2013 | Kurikko | |
| 2013/0201180 | A1 | 8/2013 | Jeon et al. | |
| 2014/0125618 | A1 | 5/2014 | Panther et al. | |
| 2014/0184671 | A1 | 7/2014 | Lee | |
| 2014/0198093 | A1 | 7/2014 | Nambi et al. | |
| 2014/0267370 | A1 | 9/2014 | Albrecht et al. | |
| 2014/0267448 | A1 | 9/2014 | Albrecht et al. | |
| 2016/0042708 | A1 | 2/2016 | Wang et al. | |
| 2016/0093248 | A1 | 3/2016 | Shimizu et al. | |
| 2016/0173862 | A1 | 6/2016 | Huang et al. | |
| 2016/0196778 | A1 | 7/2016 | Cha | |
| 2016/0307523 | A1 | 10/2016 | Huang et al. | |
| 2017/0206859 | A1 | 7/2017 | Jun et al. | |
| 2017/0243548 | A1 | 8/2017 | Wang et al. | |
| 2018/0090084 | A1 | 3/2018 | Zheng et al. | |
| 2018/0254010 | A1 | 9/2018 | Kitada et al. | |
| 2019/0035366 | A1 | 1/2019 | Li et al. | |
| 2019/0102597 | A1 | 4/2019 | Lu et al. | |
| 2019/0116304 | A1 | 4/2019 | Hasinoff et al. | |
| 2019/0180695 | A1 | 6/2019 | Ha et al. | |
| 2019/0278967 | A1 | 9/2019 | Shepelev et al. | |
| 2020/0082791 | A1 | 3/2020 | Petrie | |
| 2020/0160792 | A1 | 5/2020 | Park et al. | |
| 2020/0175246 | A1 | 6/2020 | Park | |
| 2020/0211442 | A1 | 7/2020 | Kim et al. | |
| 2020/0242321 | A1 | 7/2020 | Cao et al. | |
| 2020/0265769 | A1 | 8/2020 | Pyo et al. | |
| 2020/0286431 | A1 | 9/2020 | Sugiyama et al. | |
| 2020/0394945 | A1 | 12/2020 | Shin | |
| 2021/0012717 | A1 | 1/2021 | Park et al. | |
| 2021/0097943 | A1 | 4/2021 | Wyatt | |
| 2022/0198977 | A1* | 6/2022 | Kim | G09G 3/20 |

FOREIGN PATENT DOCUMENTS

| | | | |
|---|---|---|---|
| CN | 105103214 | B | 6/2018 |
| CN | 106875925 | B | 4/2019 |
| CN | 107274833 | B | 7/2019 |
| CN | 110086961 | A | 8/2019 |
| CN | 109686307 | B | 6/2020 |
| CN | 107591119 | B | 8/2020 |
| CN | 110276326 | B | 7/2021 |
| CN | 110473500 | B | 7/2021 |
| CN | 111916032 | B | 6/2023 |
| EP | 1220193 | B1 | 3/2004 |
| EP | 2469505 | B1 | 2/2019 |
| GB | 2562536 | A | 11/2018 |
| JP | 2003005736 | A | 1/2003 |
| JP | 2004355405 | A | 12/2004 |
| JP | 2005352412 | A | 12/2005 |
| JP | 2006030559 | A | 2/2006 |
| JP | 2006330292 | A | 12/2006 |
| JP | 2008287702 | A | 11/2008 |
| JP | 2010097097 | A | 4/2010 |
| JP | 2010130102 | A | 6/2010 |
| JP | 2014519045 | A | 8/2014 |
| JP | 2015049567 | A | 3/2015 |
| JP | 2015191039 | A | 11/2015 |
| JP | 2017049319 | A | 3/2017 |
| JP | 2019511856 | A | 4/2019 |
| JP | 2020144256 | A | 9/2020 |
| KR | 20110030212 | A | 3/2011 |
| KR | 20140108780 | A | 9/2014 |
| KR | 20180062585 | A | 6/2018 |
| TW | 201246165 | A | 11/2012 |
| WO | 2014/188789 | A1 | 11/2014 |
| WO | 2018/211287 | A1 | 11/2018 |
| WO | 2019/183786 | A1 | 10/2019 |
| WO | 2021066837 | A1 | 4/2021 |
| WO | 2022/159114 | A1 | 7/2022 |

OTHER PUBLICATIONS

International Searching Authority, International Search Report and Written Opinion mailed Oct. 15, 2021, issued in connection with International Patent Application No. PCT/US2021/014902, filed Jan. 25, 2021, 22 pages.

International Searching Authority, International Search Report and Written Opinion mailed on Jan. 7, 2022, issued in connection with International Patent Application No. PCT/US2021/026838, filed Apr. 12, 2021, 26 pages.

International Searching Authority, International Search Report and Written Opinion mailed on Sep. 8, 2021, issued in connection with International Patent Application No. PCT/US2021/033978, filed on May 25, 2021, 15 pages.

International Searching Authority, International Search Report and Written Opinion mailed on Sep. 14, 2021, issued in connection with International Patent Application No. PCT/US2020/060413, filed Nov. 13, 2020, 23 pages.

International Searching Authority, International Search Report and Written Opinion mailed on Dec. 17, 2019, issued in connection with International Patent Application No. PCT/US2019/054674 filed Oct. 4, 2019, 14 pages.

Korean Patent Office, Office Action mailed on Sep. 19, 2023, issued in connection with Korean Patent Application No. 1020227000850, 10 pages.

Taiwan Patent Office, Notice of Allowance mailed Nov. 1, 2024, issued in connection with Taiwan Patent Application No. 111144499, 6 pages.

Choi, Sangmoo, "Clock Trace Structure for Block Sequential Clock Driving," Technical Disclosure Commons, Dec. 2021, 11 pages.

International Searching Authority, International Search Report and Written Opinion mailed Jul. 29, 2022, issued in connection with International Patent Application No. PCT/US2021/073067, filed Dec. 22, 2021, 25 pages.

* cited by examiner

| | Gray Level Adjustments | Set # 1 C1 | Set # 2 C2 |
|---|---|---|---|
| R1 | R | 0 | 0 |
| R2 | G | +3 | 0 |
| R3 | B | 0 | 0 |

MODIFIED DEMURA ALGORITHM FOR DISPLAY PANELS

This application is a national stage application under 35 U.S.C. § 371 of International Application No. PCT/US2021/073067, filed Dec. 22, 2021, the disclosure of which is explicitly incorporated by reference herein in its entirety.

BACKGROUND

Many electronic computing devices include optical displays that provide visible full color. One example of a display is a liquid crystal display (LCD) that may use white light-emitting diodes (LEDs) to generate a backlight for a color filter array to define color pixels. Light passes through the liquid crystals and through the color filter, which then defines red, green, and blue (RGB) colors. Some displays can use an organic LED (OLED) where the emissive electroluminescent layer of the LED is a film of organic compound that can emit light in response to an electric current.

Sometimes, a display panel can operate at multiple refresh rates. A refresh rate may refer to the number of times per second at which an image refreshes on a display panel of a device. For example, a refresh rate of 60 Hertz (Hz) means that an image is refreshed 60 times per second. Higher refresh rates typically lead to better user experiences, but also result in higher power usage for the device. For example, when executing a video streaming application, a device may set the refresh rate of a display panel to 90 Hz, whereas when executing a word processing application, the device may set the refresh rate of the display panel to 60 Hz. Also, for example, a display panel can operate under multiple ambient light settings.

SUMMARY

The present disclosure generally relates to a display panel of a device. The display panel may be configured to provide a display, such as an image, a background, a user interface, one or more virtual objects, scrolling, video, a home screen, a lock screen, a menu, an application, games, and so forth. Depending on measured optical properties of the display panel, the device may be configured to adjust input display data when the display panel is providing a display to maintain uniform color performance.

In a first aspect, a computer-implemented method is provided. The method includes measuring, from a device having a display panel and for an input gray level at a given refresh rate, a plurality of luminance values of the display panel for a plurality of pixels located along a cross-section of the display panel. The method also includes selecting, based on the measured plurality of luminance values, a target luminance value for the display panel. The method further includes determining a luminance compensation profile for the input gray level at the given refresh rate, wherein the luminance compensation profile comprises ratios of the measured plurality of luminance values to the target luminance value. The method additionally includes storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

In a second aspect, a system is provided. The system may include one or more processors. The system may also include data storage, where the data storage has stored thereon computer-executable instructions that, when executed by the one or more processors, cause the system to carry out operations. The operations may include measuring, from a device having a display panel and for an input gray level at a given refresh rate, a plurality of luminance values of the display panel for a plurality of pixels located along a cross-section of the display panel. The operations may further include selecting, based on the measured plurality of luminance values, a target luminance value for the display panel. The operations may also include determining a luminance compensation profile for the input gray level at the given refresh rate, wherein the luminance compensation profile comprises ratios of the measured plurality of luminance values to the target luminance value. The operations may additionally include storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

In a third aspect, a device is provided. The device includes one or more processors operable to perform operations. The operations may include measuring, from a device having a display panel and for an input gray level at a given refresh rate, a plurality of luminance values of the display panel for a plurality of pixels located along a cross-section of the display panel. The operations may further include selecting, based on the measured plurality of luminance values, a target luminance value for the display panel. The operations may also include determining a luminance compensation profile for the input gray level at the given refresh rate, wherein the luminance compensation profile comprises ratios of the measured plurality of luminance values to the target luminance value. The operations may additionally include storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include measuring, from a device having a display panel and for an input gray level at a given refresh rate, a plurality of luminance values of the display panel for a plurality of pixels located along a cross-section of the display panel. The operations may further include selecting, based on the measured plurality of luminance values, a target luminance value for the display panel. The operations may also include determining a luminance compensation profile for the input gray level at the given refresh rate, wherein the luminance compensation profile comprises ratios of the measured plurality of luminance values to the target luminance value. The operations may additionally include storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

In a fifth aspect, a computer-implemented method is provided. The method may include identifying an input gray level for a display panel operating at a given refresh rate. The method may further include determining that the input gray level is below a threshold gray level, and that the display panel is operating at a brightness level below a threshold brightness level. The method may also include retrieving, from a storage at the device and for the input gray level at the given refresh rate, one or more of a luminance compensation profile or a color compensation profile, and wherein (a) the luminance compensation profile has been determined to maintain a color uniformity of a display provided by the display panel based on: measured plurality of luminance values of the display panel for a plurality of pixels located along a cross-section of the display panel, and determined ratios of the measured plurality of luminance values to a target luminance value, and (b) the color compensation profile has been determined based on: a perceived difference in a color intensity between a plurality of sections of the display panel, and a modified default register value for at least one color channel of a plurality of color channels to offset the perceived difference. The method may additionally include adjusting input display data for the input gray level at the given refresh rate using the luminance compensation profile, the color compensation profile, or both.

In a sixth aspect, a system is provided. The system may include one or more processors. The system may also include data storage, where the data storage has stored thereon computer-executable instructions that, when executed by the one or more processors, cause the system to carry out operations. The operations may include identifying an input gray level for a display panel operating at a given refresh rate. The operations may further include determining that the input gray level is below a threshold gray level, and that the display panel is operating at a brightness level below a threshold brightness level. The operations may also include retrieving, from a storage at the device and for the input gray level at the given refresh rate, one or more of a luminance compensation profile or a color compensation profile, and wherein (a) the luminance compensation profile has been determined to maintain a color uniformity of a display provided by the display panel based on: measured plurality of luminance values of the display panel for a plurality of pixels located along a cross-section of the display panel, and determined ratios of the measured plurality of luminance values to a target luminance value, and (b) the color compensation profile has been determined based on: a perceived difference in a color intensity between a plurality of sections of the display panel, and a modified default register value for at least one color channel of a plurality of color channels to offset the perceived difference. The operations may additionally include adjusting input display data for the input gray level at the given refresh rate using the luminance compensation profile, the color compensation profile, or both.

In a seventh aspect, a device is provided. The device includes one or more processors operable to perform operations. The operations may include identifying an input gray level for a display panel operating at a given refresh rate. The operations may further include determining that the input gray level is below a threshold gray level, and that the display panel is operating at a brightness level below a threshold brightness level. The operations may also include retrieving, from a storage at the device and for the input gray level at the given refresh rate, one or more of a luminance compensation profile or a color compensation profile, and wherein (a) the luminance compensation profile has been determined to maintain a color uniformity of a display provided by the display panel based on: measured plurality of luminance values of the display panel for a plurality of pixels located along a cross-section of the display panel, and determined ratios of the measured plurality of luminance values to a target luminance value, and (b) the color compensation profile has been determined based on: a perceived difference in a color intensity between a plurality of sections of the display panel, and a modified default register value for at least one color channel of a plurality of color channels to offset the perceived difference. The operations may additionally include adjusting input display data for the input gray level at the given refresh rate using the luminance compensation profile, the color compensation profile, or both.

In an eighth aspect, an article of manufacture is provided. The article of manufacture may include a non-transitory computer-readable medium having stored thereon program instructions that, upon execution by one or more processors of a computing device, cause the computing device to carry out operations. The operations may include identifying an input gray level for a display panel operating at a given refresh rate. The operations may further include determining that the input gray level is below a threshold gray level, and that the display panel is operating at a brightness level below a threshold brightness level. The operations may also include retrieving, from a storage at the device and for the input gray level at the given refresh rate, one or more of a luminance compensation profile or a color compensation profile, and wherein (a) the luminance compensation profile has been determined to maintain a color uniformity of a display provided by the display panel based on: measured plurality of luminance values of the display panel for a plurality of pixels located along a cross-section of the display panel, and determined ratios of the measured plurality of luminance values to a target luminance value, and (b) the color compensation profile has been determined based on: a perceived difference in a color intensity between a plurality of sections of the display panel, and a modified default register value for at least one color channel of a plurality of color channels to offset the perceived difference. The operations may additionally include adjusting input display data for the input gray level at the given refresh rate using the luminance compensation profile, the color compensation profile, or both.

Other aspects, embodiments, and implementations will become apparent to those of ordinary skill in the art by reading the following detailed description, with reference where appropriate to the accompanying drawings.

DETAILED DESCRIPTION

Figure 1:
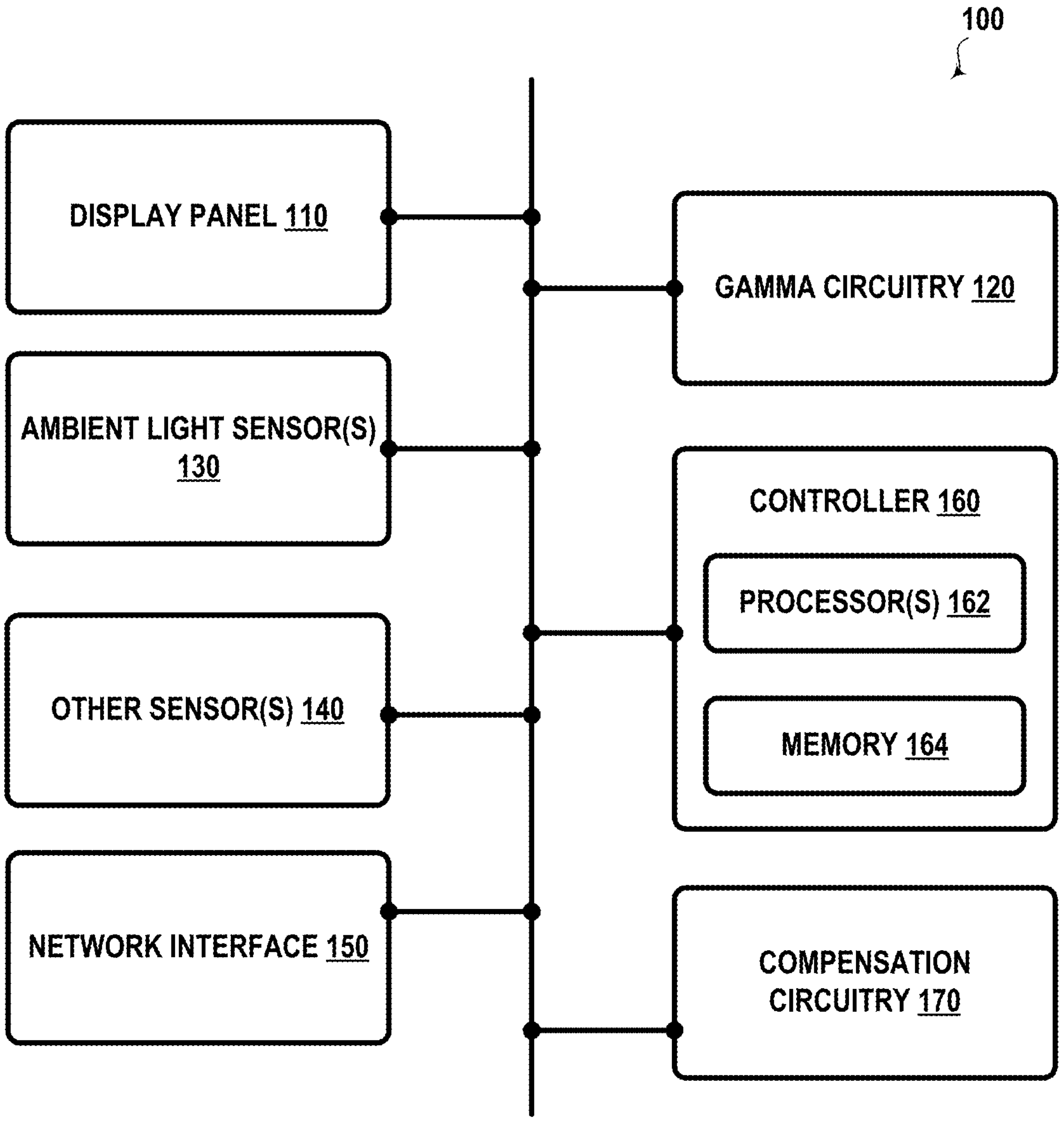
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In an OLED device, the display driver integrated circuit (DDIC) is located at the bottom portion of the device. Accordingly, the magnitude of current decreases from the bottom portion to the top portion. As the current decreases in magnitude, the display appears brighter at the bottom portion, than at the center, or the top portion.

Such non-uniform color performance can occur at steady state, such as when the display panel is providing a display at a given refresh rate. Also, for example, non-uniform color performance can occur when the display panel transitions from one refresh rate to another (e.g., from 60 Hz to 90 Hz). Also, for example, additional and/or alternative optical defects such as flicker may occur when transitioning from one refresh rate to another.

Optical characteristics may differ between different refresh rates, gray levels, brightness modes, and so forth. Specifically, the luminance and color of the display panel in steady state mode may differ based on a number of factors. Also, for example, the luminance and color of the display panel in dynamic mode (e.g., switches from a normal brightness mode to a high brightness mode, or switches from a first refresh rate to a second refresh rate), this optical difference may manifest itself as an optical defect on the display panel.

Specifically, the luminance and color of a display panel may differ between 60 Hz and 90 Hz. When the display panel switches from 60 Hz to 90 Hz (and vice versa), this optical difference may manifest itself as a visual flicker on the display panel. Consequently, if the display panel frequently switches between 60 Hz and 90 Hz refresh rates, the visual flicker may become highly pronounced and detrimental to a user's experience. Further, because human eyes are highly sensitive to changes at low luminance settings, the visual flicker is especially noticeable when the luminance of the display panel is low and/or when the ambient light of the environment surrounding the display panel is low. In some devices, flicker may be observed under strong ambient light (e.g., sunlight). This may be caused, for example, by a photo-electric effect, such as, a thin film transistor (TFT) leakage due to photons. For example, when a brightness level for high brightness mode (HBM) is at 600 nits, flicker may be less noticeable. In some devices, when the brightness level for HBM is increased to 700 nits, flickering may be observed under strong ambient light. However, as the brightness level for the HBM is increased beyond 700 nits, flickering becomes more apparent. Consequently, the optical defect may become highly pronounced and detrimental to a user's experience.

Some solutions attempt to solve this "flicker problem" by disabling transitions between 60 Hz and 90 Hz when the luminance of the display panel is low. But an issue with these solutions is that the definition of what is considered "low display luminance" can be fairly high. In some example computing devices, the ideal transition threshold to alleviate all flickering has been found to be 75%. In other words, if the luminance of the display panel is at or above 75% of the total possible luminance of the display panel, then transitions between 60 Hz and 90 Hz may be permitted. And if the luminance of the display panel is below 75% of the total possible luminance, then transitions between 60 Hz and 90 Hz may not be permitted. But because users often keep the luminance of the display panel below 75%, minimum benefits of using multiple refresh rates are obtained.

One way to achieve a smooth transition of a display panel from a first refresh rate to a second refresh rate is to minimize a difference in an optical property of the display panel during the transition at all gray levels and brightness settings. The term, "optical property" as used herein may refer to any measurable property of a display provided by a display panel of a device. For example, the optical property may refer to a color or luminance value of a display, or when a display panel transitions between different refresh rates. Also, for example, an optical property may refer to properties such as, for example, levels of refraction, absorption, scattering, reflection, and so forth.

Demura algorithms are generally applied to correct non-uniformities in color intensities. However, such algorithms are applied to high gray levels. Also, for example, manufacturers of OLED devices may apply a correction to correct non-uniformities in color intensities for 60 Hz and high brightness settings. However, no correction is available for low gray levels, or for refresh rates other than 60 Hz.

Some techniques described herein address these issues by dynamically adjusting the luminance and/or color profile. Specifically, a computing device may determine histogram data indicative of color intensities in one or more zones, and a luminance and/or color profile may be retrieved from storage based on the histogram data, and applied locally to the one or more zones.

By using the herein-described techniques, color non-uniformities in a steady state as well as a dynamic state may be reduced or eliminated. Also, for example, optical defects such as flicker may be reduced or eliminated. In one aspect, demura correction is extended to low gray levels and low brightness settings. Other advantages are also contemplated and will be appreciated from the discussion herein.

II. Example Devices

FIG. 1 illustrates computing device 100, in accordance with example embodiments. Computing device 100 includes display panel 110, gamma circuitry 120, one or more ambient light sensor(s) 130, one or more other sensor(s) 140, network interface 150, controller 160, and compensation circuitry 170. In some examples, computing device 100 may take the form of a desktop device, a server device, or a mobile device. Computing device 100 may be configured to interact with an environment. For example, computing device 100 may obtain fingerprint information from an environment around computing device 100. Also, for example, computing device 100 may obtain environmental state measurements associated with an environment around computing device 100 (e.g., ambient light measurements, etc.).

Display panel 110 may be configured to provide output signals to a user by way of one or more screens (including touch screens), cathode ray tubes (CRTs), liquid crystal displays (LCDs), light emitting diodes (LEDs), organic LEDs (OLEDs), displays using digital light processing (DLP) technology, and/or other similar technologies. Display panel 110 may also be configured to generate audible outputs, such as with a speaker, speaker jack, audio output port, audio output device, earphones, and/or other similar devices. Display panel 110 may further be configured with one or more haptic components that can generate haptic outputs, such as vibrations and/or other outputs detectable by touch and/or physical contact with computing device 100.

In example embodiments, display panel 110 is configured to be a color display utilizing a plurality of color channels for generating images. For example, display panel 110 may utilize red, green, and blue (RGB) color channels, or cyan, magenta, yellow, and black (CMYK) color channels, among other possibilities. As further described below, gamma circuitry 120 may adjust the gamma characteristics for each of the color channels of display panel 110. Also, for example, compensation circuitry 170 may adjust the color characteristics for each of the color channels of display panel 110.

In some embodiments, display panel 110 may include a plurality of pixels disposed in a pixel array defining a plurality of rows and columns. For example, if display panel 110 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display panel 110 may receive image data from controller 160 and correspondingly send signals to its pixel array in order to display the image data. For example, display panel 110 may provide such image data as a display, such as an image, a background, a wallpaper, a user interface, one or more virtual objects, scrolling, a video, a home screen, a lock screen, a menu, an application, games, and so forth. To send image data to display panel 110, controller 160 may first convert a digital image into numerical data that can be interpreted by display panel 110. For instance, a digital image may contain various image pixels that correspond to respective pixels of display panel 110. Each pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display panel 110 may provide 256 gray levels, with a numerical value of 0 corresponding to full black and a numerical value of 255 corresponding to full white. As a more specific example, controller 160 may provide to display panel 110 a digital image stream containing 24 bits, with 8 bits corresponding to a gray level for each of the red, green, and blue color channels of a pixel group.

In some cases, the luminance characteristics of images displayed by display panel 110 may be depicted inaccurately when perceived by users. Such inaccuracies may result from the non-linear response of the human eye and could cause inaccurate portrayals of color/luminance on display panel 110 from the viewpoint of users. To compensate for such inaccuracies, computing device 100 could use gamma circuitry 120.

In example embodiments, display panel 110 may include circuitry that could determine a histogram data for a display. The histogram data may represent a pixel-wise distribution of color intensity of the display while display panel 110 is operating at a given refresh rate (e.g., 60 Hz, 90 Hz, 120 Hz, etc.). In example embodiments, display panel 110 may include a plurality of zones, and the histogram data may be based on the plurality of zones. For example, display panel 110 may be divided into a top portion, a middle portion, and a bottom portion, and each portion may be associated with a respective histogram data.

Gamma circuitry 120 may include circuitry that could compensate for inaccuracies that occur when displaying images on display panel 110. To do this, gamma circuitry may include memory for storing one or more gamma curves/tables. The values in each curve/table may be determined based upon the transmittance sensitivities of display panel 110 over a range of input gray levels.

Figure 2:
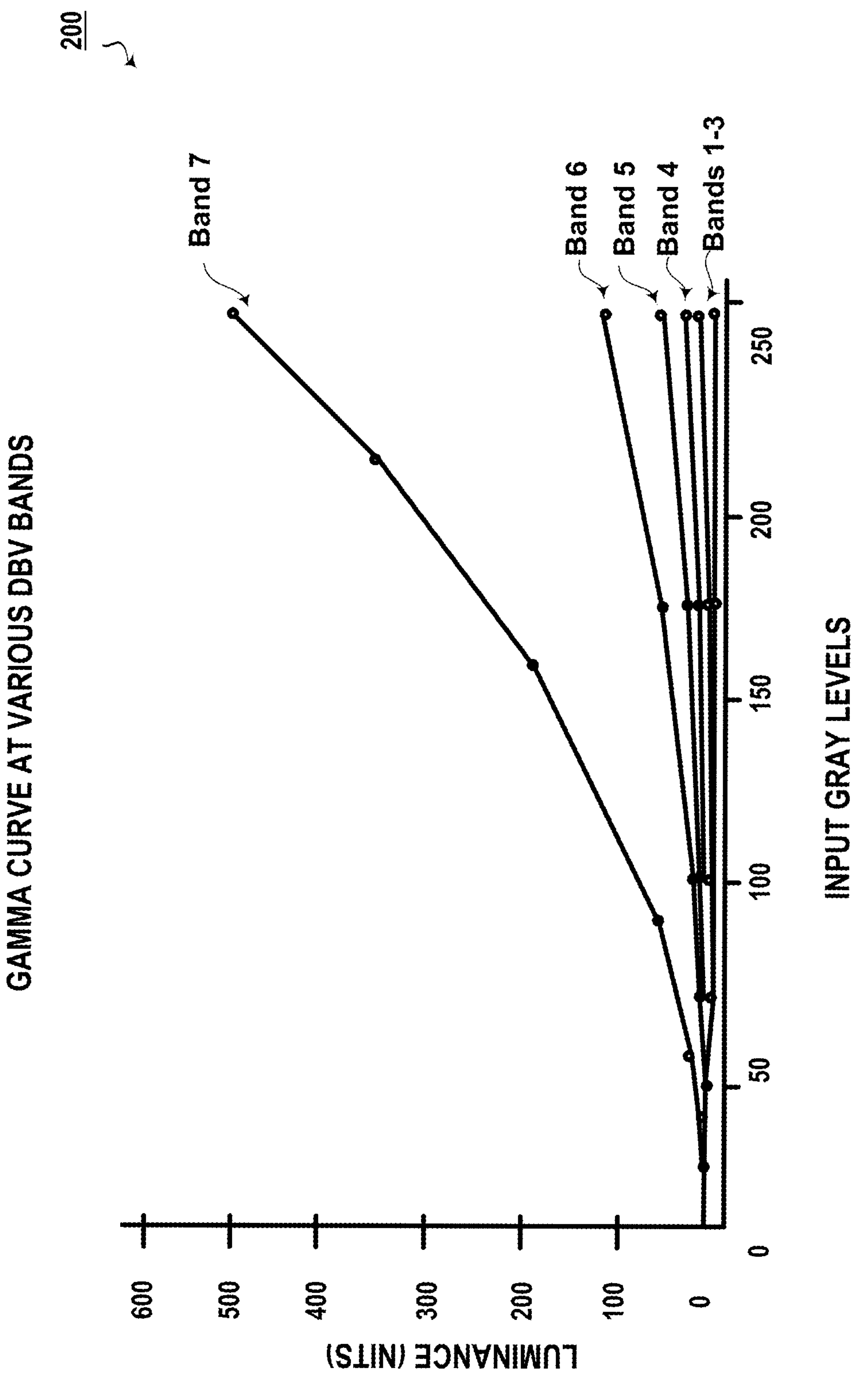
FIG. 2 depicts a graph illustrating example gamma curves, in accordance with example embodiments.

As an illustrative example, FIG. 2 depicts graph 200 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display panel 110. Based on that maximum brightness, display panel 110 may choose a corresponding DBV band (and thus a corresponding gamma curve) to compensate for inaccuracies that occur when displaying images.

As shown in graph 200, each gamma curve includes a relationship between input gray levels (on the x-axis) and luminance of a viewable image displayed on display panel 110 (on the y-axis). These relationships are non-linear. For instance, in band 7, an input gray level of 200 corresponds to a luminance value of 300 nits. Consequently, by using a gamma curve to adjust input gray levels, the images displayed on display panel 110 may exhibit a non-linear luminance to input gray level relationship. Yet, when viewed by a user, the response of the human eye may cause the user to perceive displayed images as having a linear relationship between luminance and input gray level. Thus, by using gamma curves, display panel 110 is able to produce images that may be perceived by a user as having a generally linear relationship with regard to input gray level and luminance.

Referring again to FIG. 1, ambient light sensor(s) 130 may be configured to receive light from an environment of (e.g., within 1 meter (m), 5 m, or 10 m of) computing device 100. Ambient light sensor(s) 130 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 130 may include indium gallium arsenide (InGaAs) APDs configured to detect light at wavelengths around 1550 nanometers (nm). Other types of ambient light sensor(s) 130 are possible and contemplated herein.

In some embodiments, ambient light sensor(s) 130 may include a plurality of photodetector elements disposed in a one-dimensional array or a two-dimensional array. For example, ambient light sensor(s) 130 may include sixteen detector elements arranged in a single column (e.g., a linear array). The detector elements could be arranged along, or could be at least parallel to, a primary axis. Ambient light sensor(s) 130 may detect ambient light levels, such as, for example, low ambient light (e.g., no light), strong ambient light (e.g., sunlight), and so forth.

In some embodiments, computing device 100 can include one or more other sensor(s) 140. Other sensor(s) 140 can be configured to measure conditions within computing device 100 and/or conditions in an environment of (e.g., within 1 m, 5 m, or 10 m of) computing device 100 and provide data about these conditions. For example, other sensor(s) 140 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; (v) one or more fingerprint sensor(s) that include one or more image capture devices that can take an image of a finger to authenticate a fingerprint; and/or (vi) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 140 are possible as well.

Data gathered from ambient light sensors(s) 130, and other sensor(s) 140 may be communicated to controller 160, which may use the data to perform one or more actions.

Network interface 150 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 150 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 160 may include one or more processor(s) 162 and memory 164. Processor(s) 162 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 162 may be configured to execute computer-readable instructions that are contained in memory 164 and/or other instructions as described herein.

Memory 164 may include one or more non-transitory computer-readable storage media that can be read and/or accessed by processor(s) 162. The one or more non-transitory computer-readable storage media can include volatile and/or non-volatile storage components, such as optical, magnetic, organic, or other memory or disc storage, which can be integrated in whole or in part with at least one of processor(s) 162. In some examples, memory 164 can be implemented using a single physical device (e.g., one optical, magnetic, organic or other memory or disc storage unit), while in other examples, memory 164 can be implemented using two or more physical devices.

In example embodiments, processor(s) 162 are configured to execute instructions stored in memory 164 to carry out operations.

The operations may include identifying an input gray level for a display panel 110 operating at a given refresh rate.

The operations may further include determining that the input gray level is below a threshold gray level, and that the display panel is operating at a brightness level below a threshold brightness level.

The operations may also include retrieving, from a storage at the device (e.g., memory 164) and for the input gray level at the given refresh rate, one or more of a luminance compensation profile or a color compensation profile, and wherein (a) the luminance compensation profile has been determined to maintain a color uniformity of the display 110 based on: measured plurality of luminance values of the display panel 110 for a plurality of pixels located along a cross-section of the display panel 110, and determined ratios of the measured plurality of luminance values to a target luminance value, and (b) the color compensation profile has been determined based on: a perceived difference in a color intensity between a plurality of sections of the display panel 110, and a modified default register value for at least one color channel of a plurality of color channels to offset the perceived difference.

The operations may additionally include adjusting input display data for the input gray level at the given refresh rate using the luminance compensation profile, the color compensation profile, or both.

In some embodiments, the operations may include determining a histogram data for the display panel 110. The histogram data may include a pixel-wise distribution of color intensity of the display while display panel 110 of computing device 100 is operating at a given refresh rate. In such embodiments, the retrieving and the adjusting may be based on the histogram data.

In some embodiments, display panel 110 may include a plurality of zones. The histogram data may be based on the plurality of zones. In such embodiments, the retrieving and the adjusting is based on the plurality of zones. In such embodiments, the plurality of zones may include atop, middle, and bottom portion of display panel 110. In some embodiments, the plurality of zones may be in alignment with the plurality of sections.

In some embodiments, the retrieving may include retrieving from a system on a chip (SoC).

In some embodiments, display panel 110 may be configured to operate at multiple refresh rates. The operations may further include retrieving, from the storage at computing device 100 and based on the histogram data and for the input gray level at a second refresh rate different from the given refresh rate, a second luminance compensation profile. The second luminance compensation profile may have been determined based on: measured second plurality of luminance values of the display panel 110 for the plurality of pixels located along the cross-section of the display panel 110, and determined ratios of the measured second plurality of luminance values to the target luminance value. The operations may also include adjusting the input display data for the input gray level at the second refresh rate using the second luminance compensation profile. The operations may additionally include transitioning, based on the adjusted input display data at the second refresh rate, the display panel 110 from the given refresh rate to the second refresh rate. For example, controller 160 may transition display panel 110 from a 60 Hz refresh rate to a 90 Hz refresh rate, or vice versa.

The operations may further include identifying a rate change triggering event while the display panel 110 is operating at the given refresh rate. The transitioning of the display panel 110 from the given refresh rate to the second refresh rate is performed in response to the identifying of the rate change triggering event. In some embodiments, the rate change triggering event may be initiated by a process running on the computing device 100 (e.g., brightness settings for different applications, specified times of day, and so forth). In some embodiments, the rate change triggering event may include a user interaction with display panel 110 (e.g., a fingerprint detection event where the device attempts to authenticate a fingerprint of a user of the computing device 100). In some embodiments, the rate change triggering event may be based on an environmental state measurement (e.g., by ambient light sensor(s) 130, and/or other sensor(s) 140) associated with an environment around the computing device 100.

The operations may further include, after transitioning display panel 110 from the given refresh rate to the second refresh rate, detecting that the rate change triggering event has ended. Then, the operations may include, in response to detecting that the rate change triggering event has ended, transitioning display panel 110 from the second refresh rate to the given refresh rate.

Compensation circuitry 170 may include circuitry that could apply the luminance compensation profile and the color compensation profile described herein to display panel 110. To do this, compensation circuitry 170 may include memory for storing one or more lookup tables. The values in each lookup table may be determined based upon the transmittance sensitivities of display panel 110 over a range of input gray levels. In some embodiments, compensation circuitry 170 may be included in a system on a chip (SoC).

In some embodiments, display panel 110 may include a plurality of color channels. The default gamma value may include respective register values for the plurality of color channels, and the gamma value offset may include an offset to at least one of the register values of the default gamma value. In such embodiments, the plurality of color channels may include red, green, and blue (RGB) color channels.

To modify gamma values and brightness values of tap points, some implementations involve altering one or more register values in compensation circuitry 170. For instance, compensation circuitry 170 could include a set of hardware registers for each tap point. Compensation circuitry 170 could use the values in these registers to alter the input gray levels signals sent by controller 160 to display panel 110. Generally speaking, the number of hardware registers for a given tap point corresponds to the number of color channels used by display panel 110. For example, if display panel 110 used RGB color channels, then compensation circuitry 170 may contain three hardware registers for a given tap point, each of the three registers corresponding to one of the RGB color channels. Also, for example, to apply a gamma value offset or a brightness value offset, different offsets may be applied to register values for the different RGB channels.

III. Example Luminance Compensation Profiles

Figure 3:
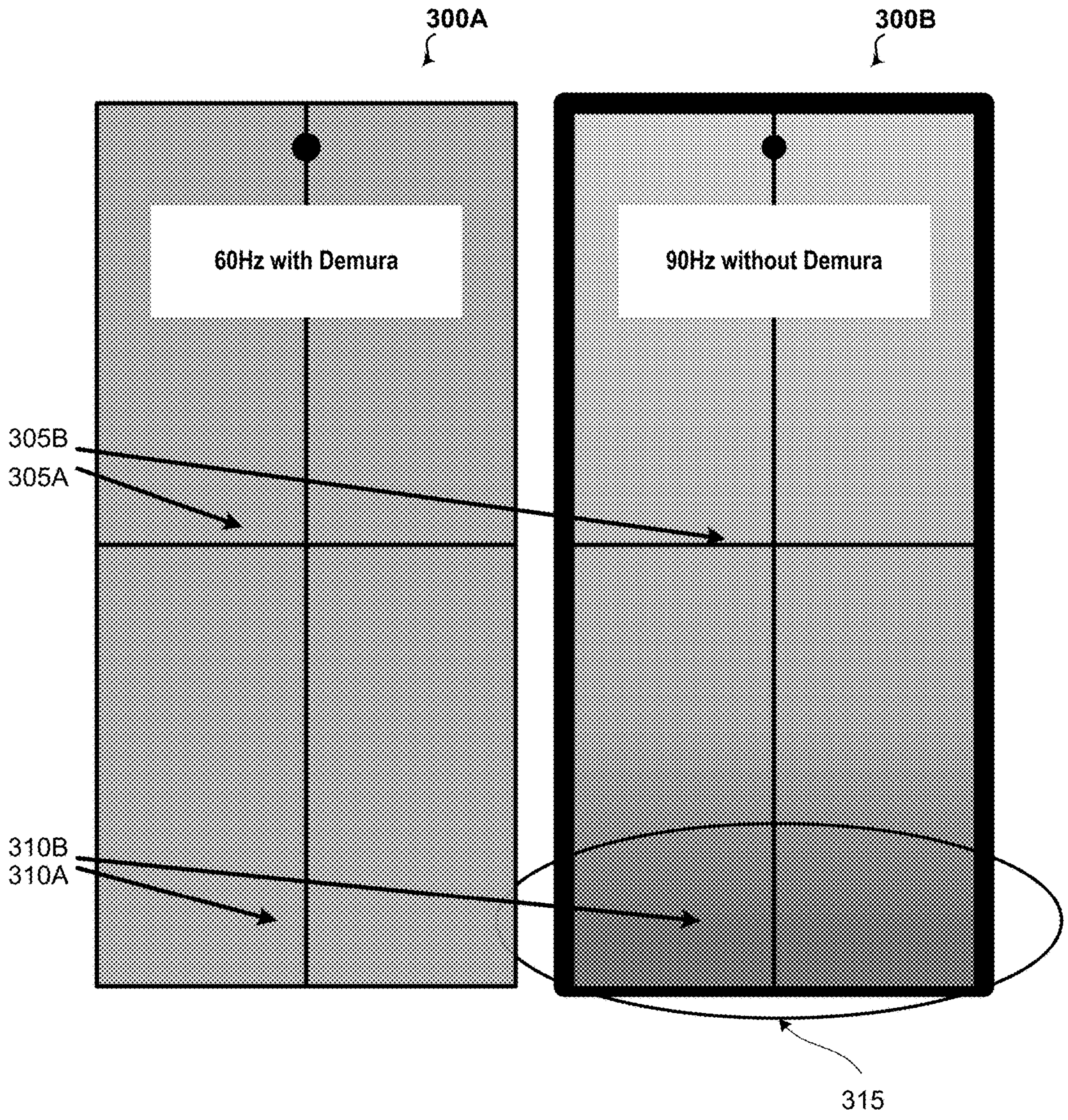
FIG. 3 illustrates a non-uniform color performance of a display device, in accordance with example embodiments.

FIG. 3 illustrates a non-uniform color performance of a display device, in accordance with example embodiments. Device 300A shows a display at a refresh rate of 60 Hz with a demura correction. For example, such a demura correction may have been applied by a manufacturer of device 300A. As illustrated, there appears to be uniform color performance across the display, including center portion 305A and bottom portion 310A. Device 300B shows a display at a refresh rate of 90 Hz, with no demura correction. As illustrated, there appears to be non-uniform color performance across the display. For example, bottom portion 310B, shown as region 315, appears to have higher color intensity than center portion 305B. Also, for example, a color performance at center portion 305B appears to match a color performance at center portion 305A. As previously described, this may be a result of a location of the DDIC in an OLED device. As the current decreases in magnitude from a bottom portion to a top portion, the display appears brighter at the bottom portion (e.g., bottom portion 310B), than at the center (e.g., center portion 305B) or the top portion.

Figure 4A:
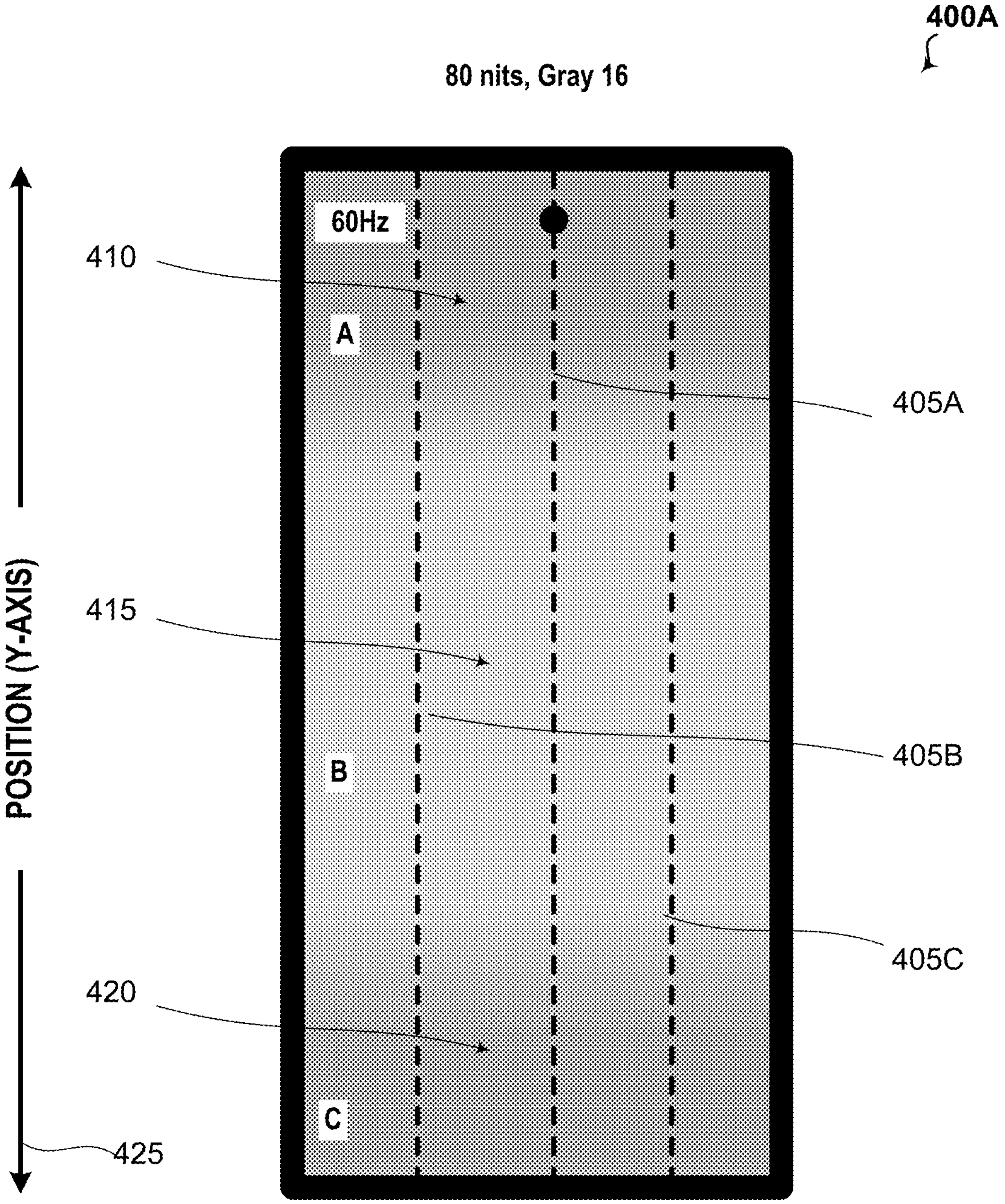
FIG. 4A depicts a device illustrating a plurality of pixels located along a cross-section of the display panel, in accordance with example embodiments.

FIG. 4A depicts a display panel 400A illustrating a plurality of pixels located along a cross-section of the display panel, in accordance with example embodiments. As described, non-uniform color performance in OLED devices occurs along a vertical direction. Accordingly, in some embodiments, the cross-section may be a longitudinal cross-section. Display panel 400A is illustrated with three different longitudinal cross-sections 405A, 405B, and 405C. Display panel 400A displays an example image at a low brightness level of 80 nits, at a low gray level of 16, and at a refresh rate of 60 Hz. As illustrated, a center portion 415 labeled B appears to be brighter than a top portion 410 labeled A, and a bottom portion 420 labeled C. Vertical axis 425 indicates a vertical position of a pixel along ay-axis. For example, each pixel along longitudinal cross-sections 405A, 405B, and 405C may be associated with a y-value along vertical axis 425.

In some embodiments, to compensate for the non-uniformity in color performance, a plurality of luminance values of the display panel 400A may be measured for a plurality of pixels located along a cross-section of the display panel 400A, such as, for example, longitudinal cross-section 405A. For example, the measuring may be performed by an image capturing device (e.g., a spectroradiometer or a colorimeter) configured to measure the plurality of luminance values. In some embodiments, the measuring may be performed for every pixel along the longitudinal cross-section 405A. In some embodiments, the measuring may be performed by dividing the longitudinal cross-section 405A by 10 or by 20, to identify appropriately spaced pixels along longitudinal cross-section 405A.

As described previously, demura correction is generally not available for low gray levels, or for refresh rates other than 60 Hz. Also, for example, demura correction may not be needed for high brightness settings. In some embodiments, the measuring may be performed for input gray levels below a threshold gray level, and when the display panel is operating at a brightness level below a threshold brightness level. The threshold gray level and/or the threshold brightness level may be chosen based on a type of device, available power resources, available memory resources, and so forth.

In order to determine luminance values at different tap points, refresh rates, ambient light settings, and/or brightness modes, images can be analyzed for the luminance values. For example, values for an optical property (e.g., color or luminance) may be measured from the cross-section of an image captured by the image capturing device. In some instances, depending on how the image capturing device is calibrated, the measurement of a luminance value may not be an absolute value, but may be a relative value between two refresh rates. In some embodiments, one or more optical properties can be measured at each refresh rate, and these measured values can be used individually, or in combination. For example, the luminance values, color, and/or a combination of the two may be used. Additional and/or alternative optical properties can be used. Also, for example, different measurements can be determined for various optical viewing distances and/or viewing angles, and such measurements can be appropriately normalized and/or averaged. For purposes of clarity, the examples herein refer to a specific optical property such as luminance or color intensity.

Figure 4B:
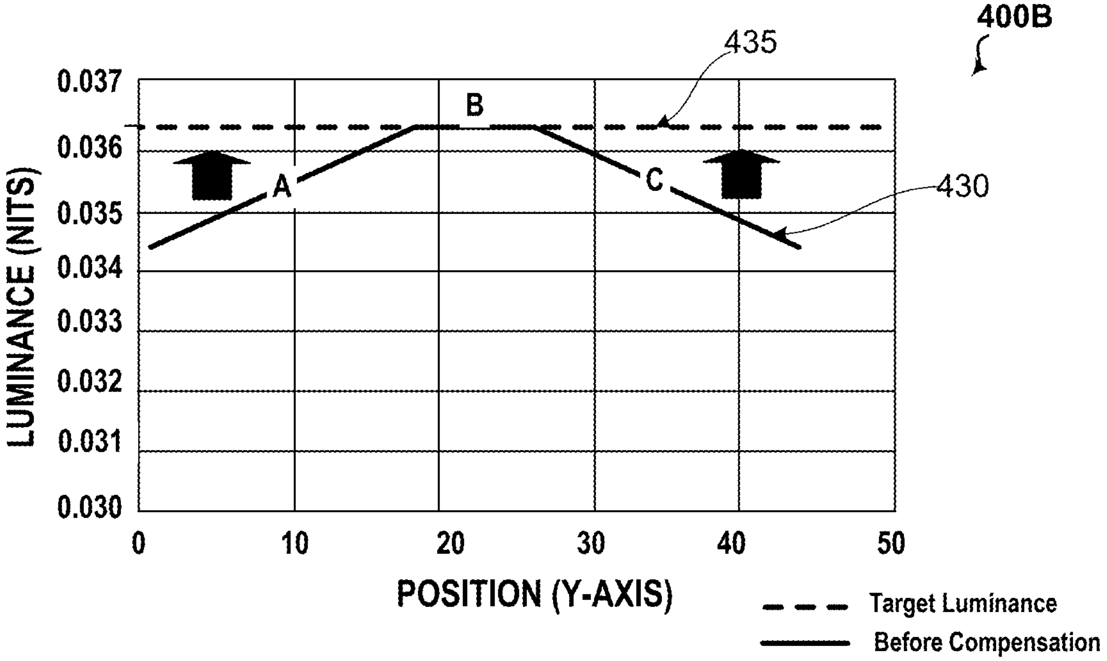
FIG. 4B depicts a graph illustrating a target luminance value and a plurality of luminance values of the display panel, in accordance with example embodiments.

FIG. 4B depicts a graph 400B illustrating a target luminance value 435 and a plurality of luminance values 430 of the display panel, in accordance with example embodiments. The vertical axis represents luminance in nits, and the horizontal axis represents a pixel position along ay-axis (e.g., vertical axis 425 of FIG. 4A). In some embodiments, target luminance value 435 may correspond to a luminance value of pixels at the center of the display panel (e.g., center portion 415 of FIG. 4A). In some embodiments, target luminance value 435 may correspond to an average, or a median, or measured luminance values. For example, target luminance value 435 may correspond to an average, or a median of measured luminance values for pixels located along central portions of longitudinal cross-sections 405A, 405B, and 405C. Additional, and/or alternative values may be selected as a target luminance value.

Curve 430 represents a piecewise function that includes three portions labeled A, B, and C. For illustrative purposes, the portions A, B, and C may correspond to luminance values for pixels located respectively in top portion 410 labeled A, center portion 415 labeled B, and bottom portion 420 labeled C, of FIG. 4A. As indicated, portion B of curve 430 corresponds to high luminance values, whereas the luminance values taper off for portions A and C. To maintain a color uniformity of the display, it may be desirable to adjust the luminance values for pixels located in top portion 410 labeled A, and bottom portion 420 labeled C, to make them consistent with the luminance values for center portion 415 labeled B.

Accordingly, a luminance compensation profile may be determined. The luminance compensation profile may include ratios of the measured plurality of luminance values to the target luminance value. For example, the luminance compensation profile may be determined for a pixel, $p_y$, located at y along longitudinal cross-section 405B of FIG. 4A, as a collection of compensation ratios, Compensation $\text{Ratio}_{p_y}$, determined as:

$$\text{Compensation Ratio}_{p_y} = \frac{\text{Target Luminance Value}}{\text{Luminance Value}_{p_y}} \quad \text{(Eqn. 1)}$$

where Luminance $\text{Value}_{p_y}$ represents the luminance value of pixel, $p_y$ located at y along longitudinal cross-section 405B. For example, Compensation $\text{Ratio}_{p_y}=1$ for pixels $p_y$ located in center portion 415 labeled B, as these correspond to the target luminance value. Also, for example, Compensation $\text{Ratio}_{p_y}>1$ for pixels $p_y$ located in top portion 410 labeled A, and bottom portion 420 labeled C.

In some embodiments, based on the luminance compensation profile and for the input gray level at the given refresh rate, modified luminance values for use by the device may be determined. The modified luminance values maintain the color uniformity of the display. For example, referring to Eqn. 1, a modified luminance value may be determined as:

$$\text{Compensation Ratio}_{p_y} * \text{Luminance Value}_{p_y} \quad \text{(Eqn. 2)}$$

In some embodiments, the measuring described with reference to FIG. 4A may be repeated for a different refresh rate, such as, for example, 90 Hz, 120 Hz, 144 Hz, and so forth. For example, the method may involve measuring, from the device and for the input gray level at a second refresh rate (e.g., 90 Hz) different from the given refresh rate (e.g., 60 Hz), a second plurality of luminance values of the display panel for a second plurality of pixels located along the longitudinal cross-section of the display panel. Based on the measured second plurality of luminance values, a second luminance compensation profile for the input gray level at the second refresh rate (e.g., 90 Hz) may be determined. The second luminance compensation profile includes ratios of the measured second plurality of luminance values to the target luminance value (e.g., measured at 60 Hz).

For example, the second luminance compensation profile may be determined for a pixel, $p_y$, located at y along longitudinal cross-section (e.g. longitudinal cross-section 405B of FIG. 4A applied to a display panel operating at 90 Hz), as a collection of second compensation ratios, Compensation $\text{Ratio}_{p_y}^{60,90}$, determined as:

$$\text{Compensation Ratio}_{p_y}^{60,90} = \frac{\text{Target Luminance Value}^{60}}{\text{Luminance Value}_{p_y}^{90}} \quad \text{(Eqn. 3)}$$

where Target Luminance $\text{Value}^{60}$ is the target luminance value at the given refresh rate (e.g., 60 Hz), and Luminance $\text{Value}_{p_y}^{90}$ represents the luminance value of pixel, $p_y$ located at y along longitudinal cross-section for a display panel operating at the second refresh rate (e.g., 90 Hz). For example, curve 430 may represent Luminance $\text{Value}_{p_y}^{90}$.

In some embodiments, to maintain a consistency of color performance between the given refresh rate and the second refresh rate, the second luminance compensation profile may be determined for a pixel, $p_y$, located at y along longitudinal cross-section (e.g. longitudinal cross-section 405B of FIG. 4A applied to a display panel operating at 90 Hz), as a collection of products, Compensation $\text{Factor}_{p_y}^{60,90}$, of the measured second plurality of luminance values with the ratios of the measured plurality of luminance values to the target luminance value. For example, $$\text{Compensation Factor}_{p_y}^{60,90} = \text{Compensation Ratio}_{p_y} * \text{Luminance Value}_{p_y}^{90} \quad \text{(Eqn. 4)}$$

where Compensation $\text{Ratio}_{p_y}$ is from Eqn. 1, and Luminance $\text{Value}_{p_y}^{90}$ represents the luminance value of pixel, $p_y$ located at y along longitudinal cross-section for a display panel operating at the second refresh rate (e.g., 90 Hz).

Figure 4C:
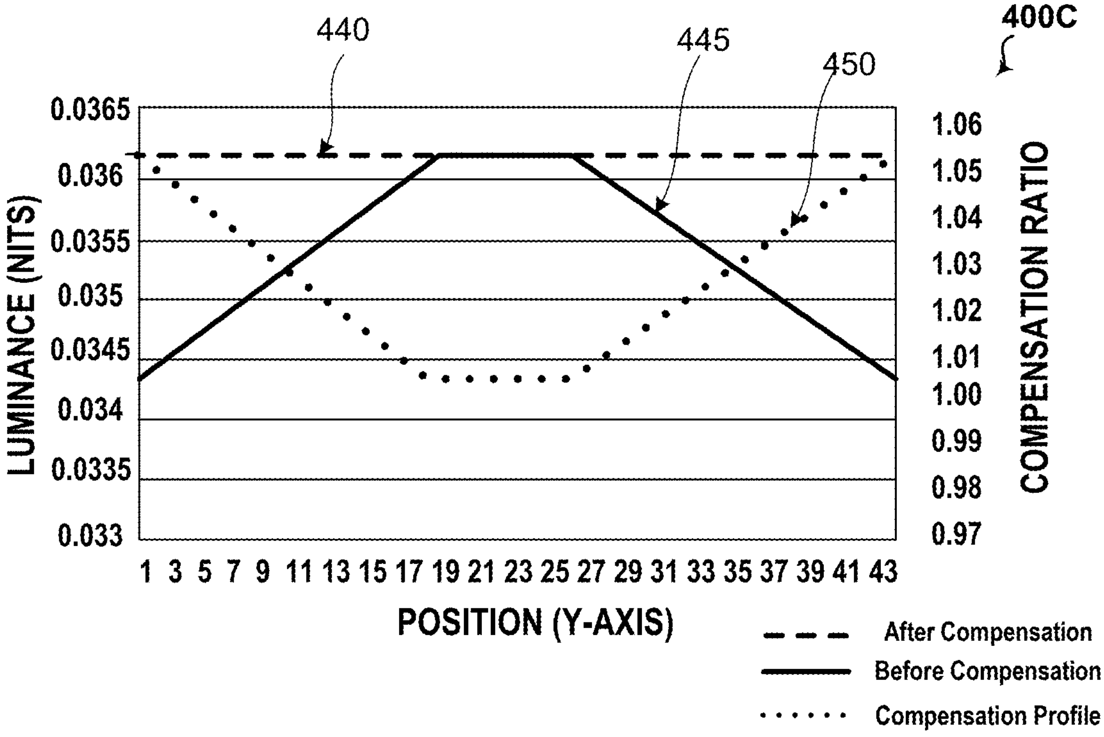
FIG. 4C depicts a graph illustrating a luminance compensation profile, in accordance with example embodiments.

FIG. 4C depicts a graph 400C illustrating a luminance compensation profile, in accordance with example embodiments. The vertical axis represents luminance in nits, and the horizontal axis represents a pixel position along ay-axis (e.g., vertical axis 425 of FIG. 4A). Graph 400C also represents compensation ratios along the vertical direction. For example, target luminance 440 may be a target luminance value based on a given refresh rate, such as, for example, 60 Hz (e.g. Target Luminance Value of Eqn. 1, or Target Luminance $\text{Value}^{60}$ of Eqn. 3). Also, for example, curve 445 may represent measured luminance values (e.g., Luminance $\text{Value}_{p_y}$ of Eqn. 1) or measured second luminance values (e.g., Luminance $\text{Value}_{p_y}^{90}$ of Eqn. 4). Also, for example, curve 450 may represent compensation ratios (e.g., Compensation $\text{Ratio}_{p_y}$ of Eqn. 1).

In some embodiments, the luminance compensation profile for the input gray level at the given refresh rate may be stored at the device. For example, Compensation $\text{Ratio}_{p_y}$ of Eqn. 1 may be stored as a luminance compensation profile. In some embodiments, Compensation $\text{Ratio}_{p_y}^{60,90}$ of Eqn. 3, or Compensation $\text{Factor}_{p_y}^{60,90}$ of Eqn. 4 may be stored as a luminance compensation profile. In some embodiments, the luminance compensation profile may be stored in a system on a chip (SoC).

As described herein, the wherein the measuring of the plurality of luminance values (resp. second luminance values), the selecting of the target luminance value, and the determining of the luminance compensation profile (resp. second luminance compensation profile), can be performed for a given display brightness value (DBV) for the display panel. Also, for example, the aforementioned steps can be performed for a plurality of input gray levels, refresh rates, brightness settings, and so forth. As another example, the aforementioned steps can be performed for a plurality of devices. The storing can be performed at the factory, and the luminance compensation profiles (resp. second luminance compensation profiles) can be stored as lookup tables (LUTs) for each device.

In some embodiments, subsequent to the storing, the device may configured to adjust input display data using the luminance compensation profile (e.g., Compensation $\text{Ratio}_{p_y}$ of Eqn. 1) for the input gray level when the display panel is providing a display. In some embodiments, subsequent to the storing, the device may be configured to adjust input display data using the second luminance compensation profile (e.g., Compensation $\text{Ratio}_{p_y}^{60,90}$ of Eqn. 3, or Compensation $\text{Factor}_{p_y}^{60,90}$ of Eqn. 4) for the input gray level when the display panel is transitioning from the given refresh rate (e.g., 60 Hz) to the second refresh rate (e.g., 90 Hz). Techniques described herein are generally applicable to transitions from a first refresh rate to a second refresh rate, such as, for example, transitions from 90 Hz to 120 Hz, 60 Hz to 120 Hz, and so forth.

IV. Example Color Compensation Profiles

Figure 5:
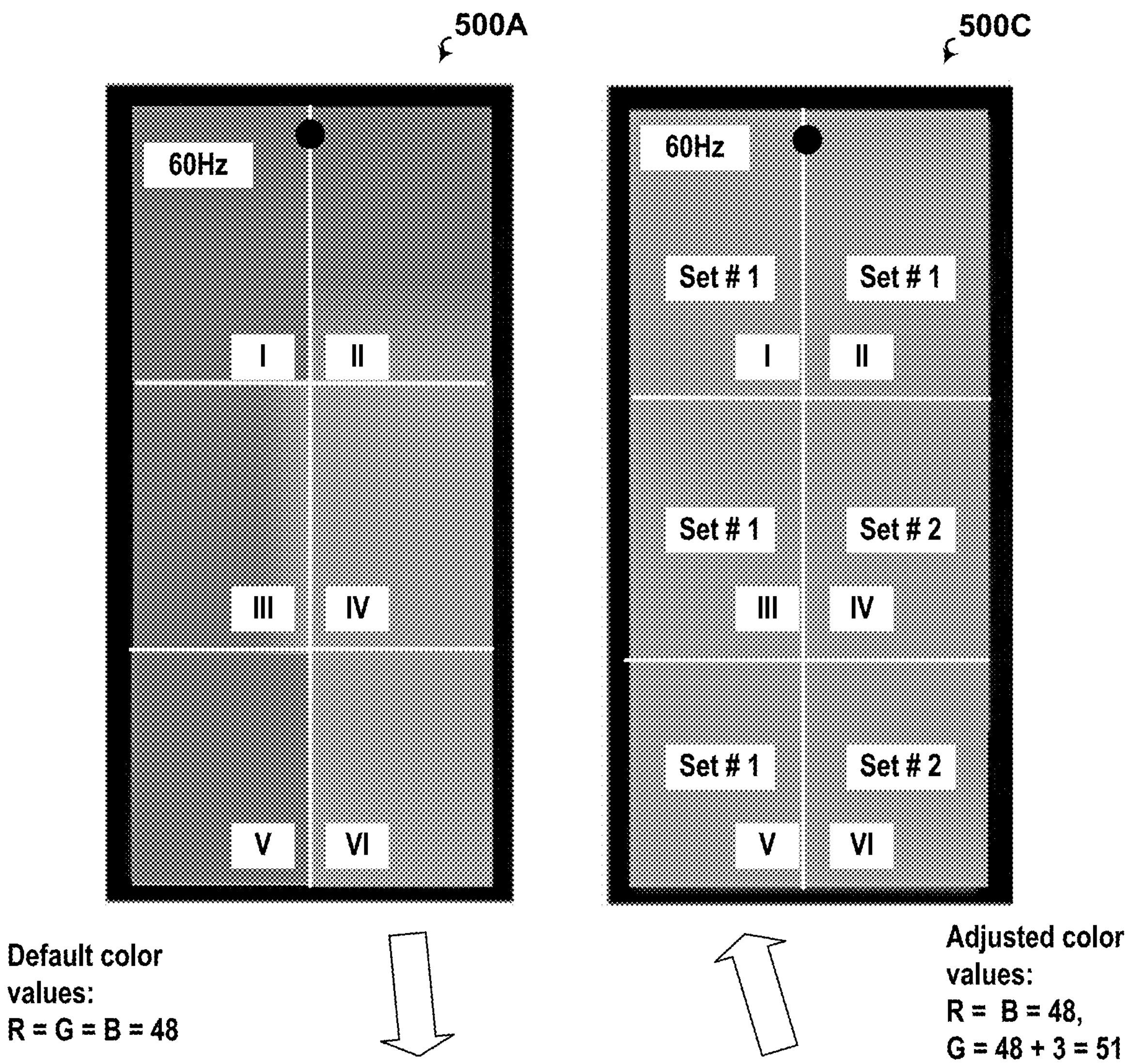
FIG. 5 illustrates a color compensation profile, in accordance with example embodiments.

FIG. 5 illustrates a color compensation profile, in accordance with example embodiments. Display panel 500A may have a plurality of color channels, and is illustrated with a partitioning into a plurality of sections. For example, six sections labeled I through VI are shown. A number of sections and a type of partitioning may depend on a display device. Instead of pixel wise adjustment, a color adjustment may be performed based on the plurality of sections. In some embodiments, the plurality of color channels may include red, green and blue (RGB) color channels. In some embodiments, a perceived difference in a color intensity between the plurality of sections may be determined. For example, at the given refresh rate (e.g., 60 Hz), color intensities may be measured for display panel 500A for various color combinations. For example, color intensities for solid red, green, blue images may be measure from an image, using a colorimeter, and differences in color intensities may be identified between the sections.

As illustrated, display panel 500A may display an image with a default color profile of RGB corresponding to 48/48/48. However, color differences may be observed. For example, sections I, II, III, and V may appear to be more pinkish than sections IV and VI. In some embodiments, based on the perceived difference in the color intensity, a color compensation profile for the plurality of sections may be determined. The color compensation profile modifies a default register value for at least one color channel of the plurality of color channels to offset the perceived difference in the color intensity. For example, to maintain color uniformity for the display in display panel 500A, a value for the green element may be increased by +3.

Accordingly, an example lookup table 500B may be generated for the color compensation profile. The example lookup table 500B is shown with three rows, R1, R2, and R3. Column C1 represents a first set, Set #1, corresponding to values in rows R1, R2, and R3, for R, G, and B, respectively. Accordingly, Set #1 has a compensation profile {R=0, G=+3, B=0}. Likewise, column C2 represents a second set, Set #2, corresponding to values in rows R1, R2, and R3, for R, G, and B, respectively. Accordingly, Set #2 has a compensation profile {R=0, G=0, B=0}. As described previously, sections I, II, III, and V may appear to be more pinkish than sections IV and VI. Accordingly, the color offset for +3 is applied to the G value. This generates a color compensation profile display panel 500A. For example, as illustrated in display panel 500C, sections I, II, III, and V are mapped to Set #1, and sections IV and VI are mapped to Set #2.

In some embodiments, the color compensation profile for the input gray level at the given refresh rate may be calibrated at the factory and stored at the device (e.g., in a SoC). Subsequent to the storing, the device may be configured to adjust the input display data using the color compensation profile for the input gray level when the display panel is providing a display.

For example, when display panel 500C displays an image with a color non-uniformity, for example, as described with respect to display panel 500A, then a color compensation profile may be applied. In some embodiments, each of the plurality of sections may be mapped to a color compensation profile that indicates a color correction (e.g., an adjustment to one or more R, G, B values). For example, when the image is displayed, instead of default RGB values of 48/48/48, sections I, II, III, and V may apply adjusted RGB values of 48/51/48, and sections IV, and VI may apply default RGB values of 48/48/48.

A plurality of color compensation profiles may be stored. For example, color compensation profiles may be determined based on input gray levels, DBV bands, refresh rates, brightness modes, and so forth.

Generally, for a given module of a display panel, a color profile can be determined, and a corresponding color compensation profile can be retrieved from storage, and applied. When the next module is loaded (e.g., a background is changed, a wallpaper is changed, or a new screen is loaded) by the display panel, the color profile will likely change, and so a new color compensation profile is retrieved from storage, and applied.

V. Example Histogram Data

In some embodiments, a histogram data for the display panel may be determined. The histogram data may generally represent a pixel-wise distribution of color intensity of a display while a display panel of a device is operating at a given refresh rate.

Figure 6A:
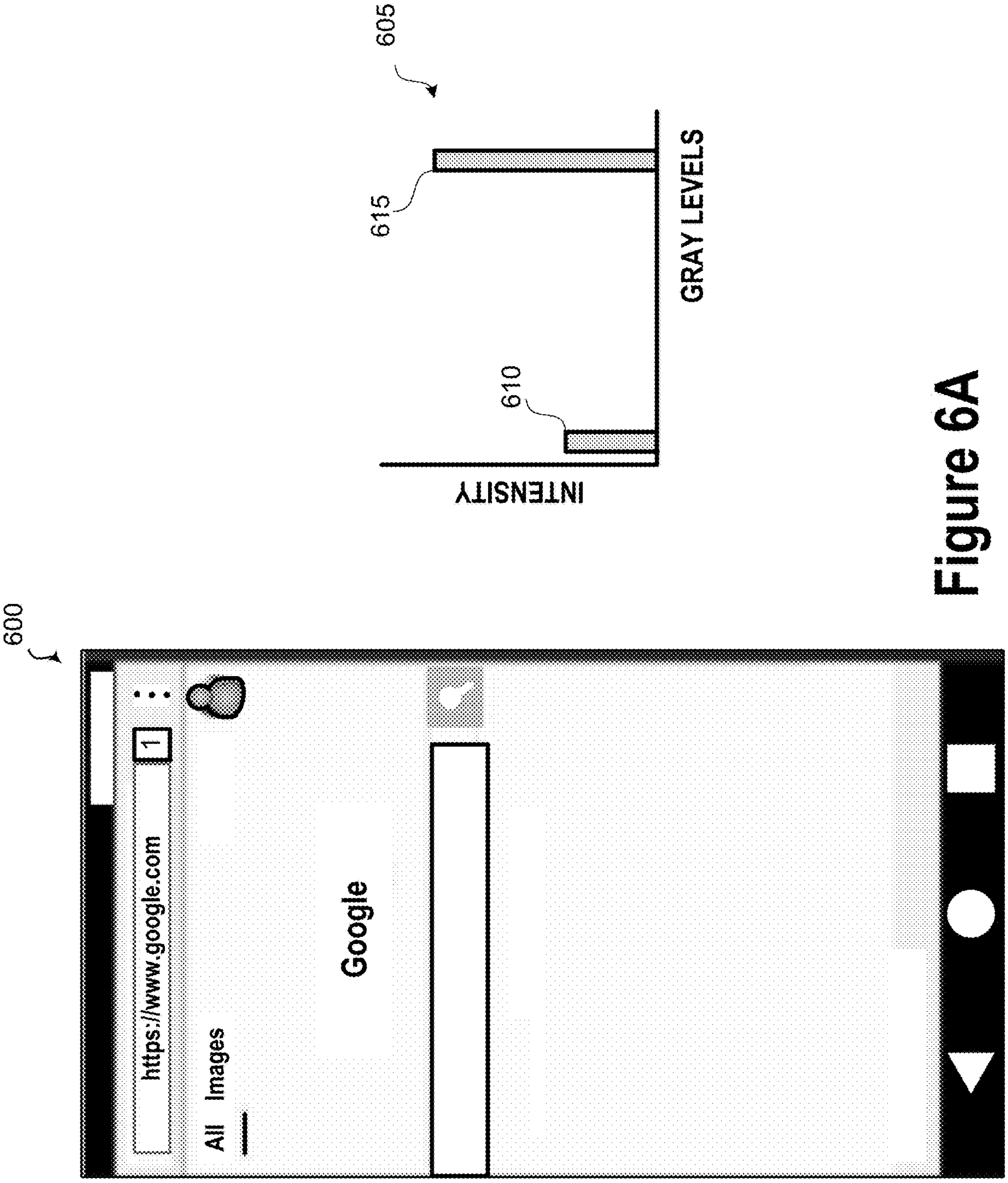
FIG. 6A illustrates histogram data, in accordance with example embodiments.
Figure 6B:
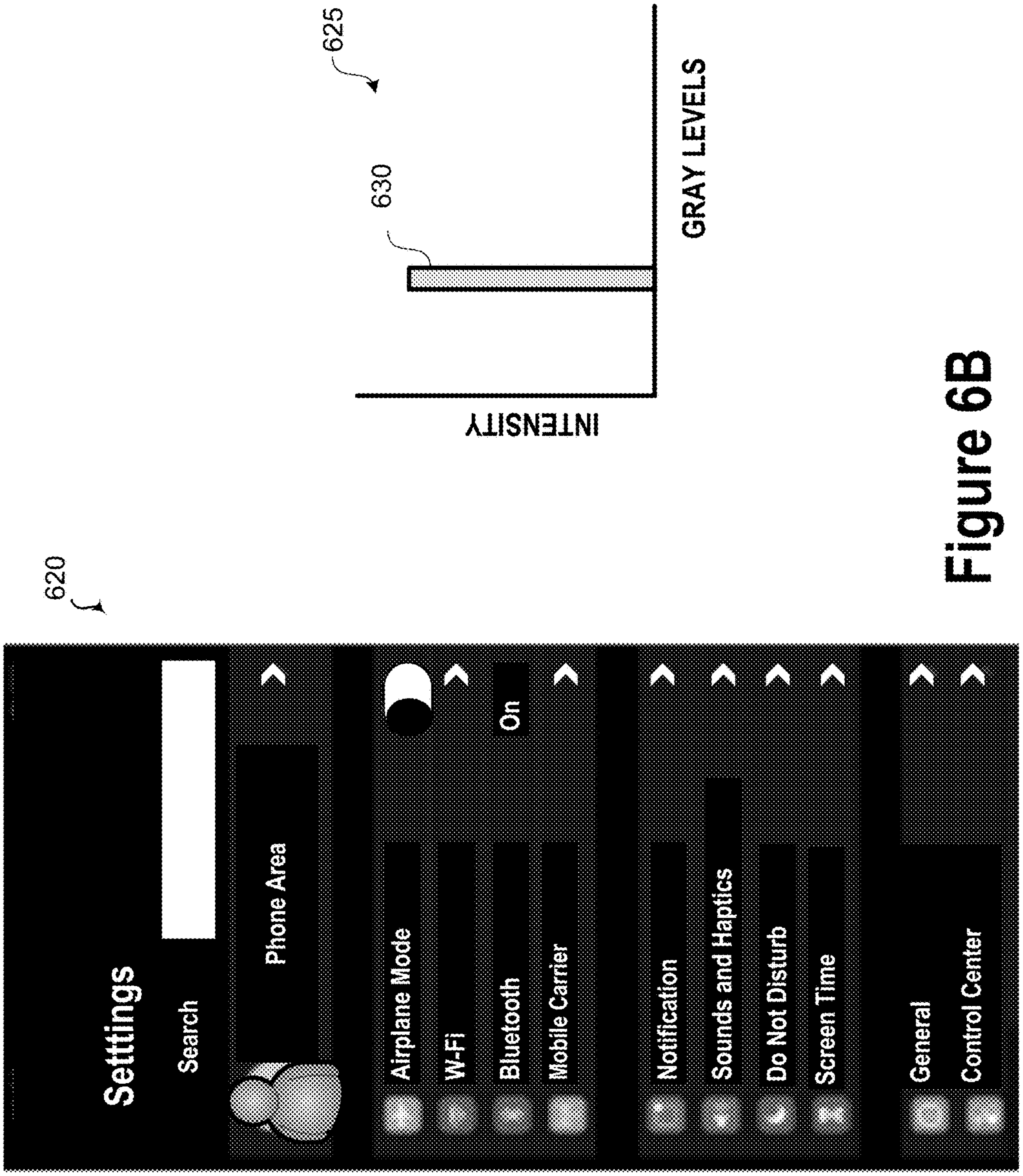
FIG. 6B illustrates histogram data, in accordance with example embodiments.
Figure 6C:
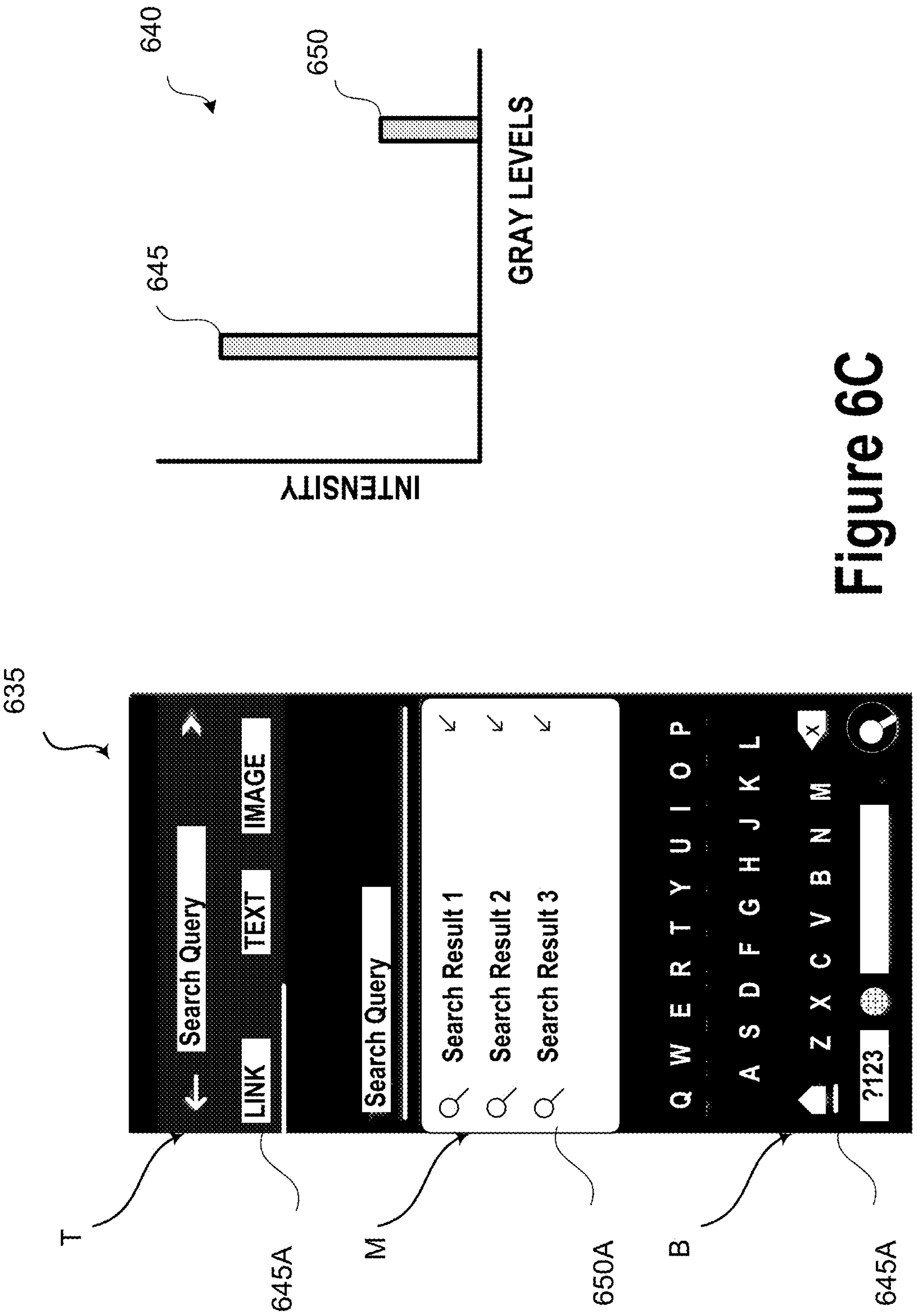
FIG. 6C illustrates histogram data, in accordance with example embodiments.

FIGS. 6A, 6B, and 6C illustrate example histogram data, in accordance with example embodiments. A vertical axis of a respective histogram represents color intensity, and the horizontal axis represents gray levels. Generally, a higher value of the gray level corresponds to higher brightness (e.g., bright image content), and a lower value of the gray level corresponds to lower brightness (e.g., dark image content).

For example, referring to FIG. 6A, display panel 600 is shown with an associated histogram 605. Histogram 605 includes two bars 610 and 615, where bar 615 has a larger height than bar 610. Also, bar 615 is located at a higher gray level than bar 610. This indicates that a substantial portion of display panel 600 corresponds to a high brightness image. Accordingly, non-uniformities in color are less perceptible, and no compensation may be applied.

As another example, referring to FIG. 6B, display panel 620 is shown with an associated histogram 625. Histogram 625 includes one bar 630, which is located at a low gray level. This indicates that a substantial portion of display panel 620 corresponds to a low brightness, or darker, image. Accordingly, non-uniformities in color are perceptible, and a compensation may be applied to the entire image. In some embodiments, the input display data for the input gray level at the given refresh rate may be compensated using the luminance compensation profile, the color compensation profile, or both.

Also, for example, referring to FIG. 6C, display panel 635 is shown with an associated histogram 640. Histogram 640 includes two bars 645 and 650, where bar 645 has a larger height than bar 650. Also, bar 645 is located at a lower gray level than bar 650. This indicates that a large portion 645A of display panel 635 corresponds to a low brightness image, and there is a smaller portion 650A corresponding to a high brightness image. Accordingly, non-uniformities in color are less perceptible in the smaller portion 650A corresponding to the high brightness image, and no compensation may be applied to the smaller portion 650A. However, non-uniformities in color are perceptible in the large portion 645A, and a compensation may be applied to the large portion 645A.

In some embodiments, the display panel may include a plurality of zones, and the histogram data may be based on the plurality of zones. For example, the plurality of zones may include a top, middle, and bottom portion of the display panel. For example, for display panel 635, the plurality of zones may include a top portion T, a middle portion M, and a bottom portion B. In some embodiments, the retrieving and the adjusting may be based on the plurality of zones. For example, a luminance compensation profile and/or a color compensation profile may be retrieved for a particular zone, and the adjusting of the input display data for the input gray level may be performed locally for the particular zone.

In some embodiments, the plurality of zones may be in alignment with the plurality of sections. For example, referring to FIG. 5, sections I and II may be combined to align with a top portion, sections III and IV may be combined to align with a middle portion, and sections V and VI may be combined to align with a bottom portion. In some embodiments, the sections I through VI of FIG. 5 may also be the plurality of zones. Generally, a larger number of sections and/or zones may yield better image resolution, and more effective color correction.

Generally, compensation may not be needed for high gray levels and/or for high brightness settings. Color non-uniformity issues typically arise when there is a dark theme, or a low gray level/low brightness level situation. In an effort to save power and memory resources, it may be desirable not to waste demura on high brightness/high gray level areas. Instead, histogram data may be used to identify the dark theme, or low gray level/low brightness level zones, and apply an appropriate luminance compensation profile, or color compensation profile, or both, locally to the identified zones.

As described herein, luminance compensation profile, or color compensation profile, may be measured and calibrated independent of each other. In some embodiments, only a luminance compensation profile may be determined and stored. Likewise, in some embodiments, only a color compensation profile may be determined and stored. Although examples described herein illustrated determining a luminance compensation profile prior to determining a color compensation profile, the opposite may apply as well. For example, a color compensation profile may be determined prior to determining a luminance compensation profile.

Generally, human eyes are more sensitive to changes in color in adjacent zones. Accordingly, based on histogram data for the plurality of zones, a color compensation profile may be applied to the plurality of zones. However, during transition from a first refresh rate to a second refresh rate, luminance compensation may be easier to achieve. Also, for example, applying a color compensation during the transition may require additional computing resources. Accordingly, a luminance compensation profile may be applied when transitioning from the first refresh rate to the second refresh rate.

Also, for example, based on histogram data, a color compensation profile may be applied by determining an overlap between the plurality of sections and the plurality of zones. For example, sections I and II of FIG. 5 may overlap with zone T of FIG. 6, sections III and IV of FIG. 5 may overlap with zone M of FIG. 6, and sections V and VI of FIG. 5 may overlap with zone B of FIG. 6. Accordingly, color compensation profile for sections I and II may be based on histogram data for zone T, color compensation profile for sections III and IV may be based on histogram data for zone M, and color compensation profile for sections V and VI may be based on histogram data for zone B.

In some embodiments, the luminance compensation profile and/or the color compensation profile may be applied as virtual (alpha) layers. An alpha layer is a polarizer layer of an OLED device, and enables pixel-wise adjustment of luminance values and/or color intensities.

VI. Example Methods

Figure 7:
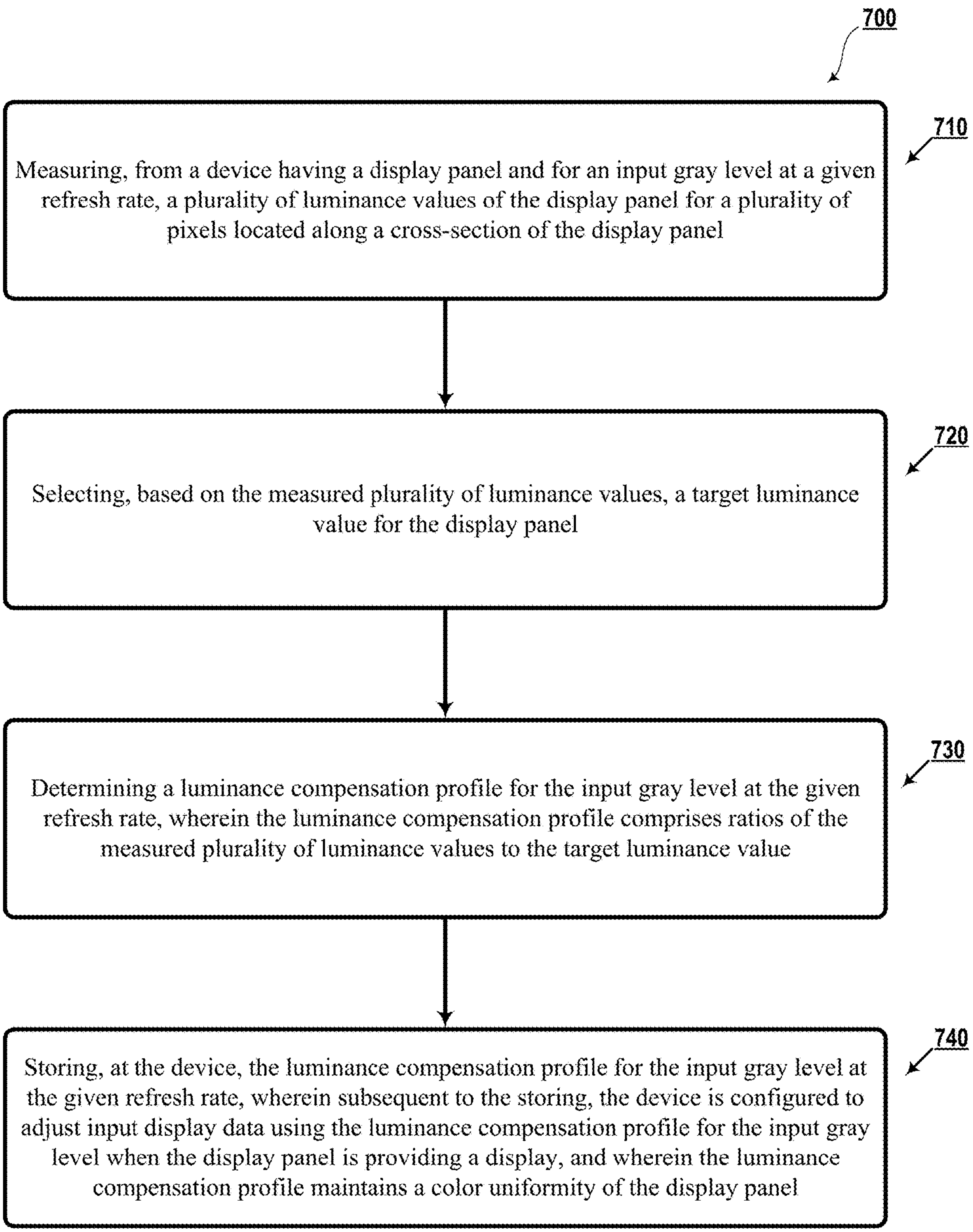
FIG. 7 illustrates a method, in accordance with example embodiments.

FIG. 7 illustrates a method 700, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700.

The blocks of method 700 may be carried out by various elements of computing device 100 as illustrated and described in reference to FIG. 1. Furthermore, method 700 may utilize the relationships that are illustrated and described with regard to FIGS. 4A, 4B, 4C, and 5.

Block 710 includes measuring, from a device having a display panel and for an input gray level at a given refresh rate, a plurality of luminance values of the display panel for a plurality of pixels located along a cross-section of the display panel.

Block 720 includes selecting, based on the measured plurality of luminance values, a target luminance value for the display panel.

Block 730 includes determining a luminance compensation profile for the input gray level at the given refresh rate, wherein the luminance compensation profile comprises ratios of the measured plurality of luminance values to the target luminance value.

Block 740 includes storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

Some embodiments include determining, based on the luminance compensation profile and for the input gray level at the given refresh rate, modified luminance values for use by the device, wherein the modified luminance values maintain the color uniformity of the display.

In some embodiments, the storing may include storing, on a system on a chip (SoC) and for a plurality of input gray levels and a plurality of refresh rates, a plurality of respective luminance compensation profiles.

In some embodiments, the cross-section may be a longitudinal cross-section, and the target luminance value may correspond to a luminance value from a central portion of the longitudinal cross-section.

In some embodiments, the display panel may be configured to operate at multiple refresh rates. Such embodiments include measuring, from the device and for the input gray level at a second refresh rate different from the given refresh rate, a second plurality of luminance values of the display panel for a second plurality of pixels located along the cross-section of the display panel. Such embodiments also include determining a second luminance compensation profile for the input gray level at the second refresh rate, wherein the second luminance compensation profile comprises products of the measured second plurality of luminance values with the ratios of the measured plurality of luminance values to the target luminance value. Such embodiments additionally include storing, at the device, the second luminance compensation profile for the input gray level at the second refresh rate, wherein subsequent to the storing, the device is configured to adjust input display data using the second luminance compensation profile for the input gray level when the display panel is transitioning from the given refresh rate to the second refresh rate.

In some embodiments, the given refresh rate may be 60 Hertz (Hz) and the second refresh rate may be 90 Hz.

In some embodiments, the display panel may have a plurality of color channels, and the display panel may include a partitioning into a plurality of sections. Such embodiments include determining a perceived difference in a color intensity between the plurality of sections. Such embodiments also include determining, based on the perceived difference in the color intensity, a color compensation profile for the plurality of sections, wherein the color compensation profile modifies a default register value for at least one color channel of the plurality of color channels to offset the perceived difference in the color intensity. Such embodiments additionally include storing, at the device, the color compensation profile for the input gray level at the given refresh rate, wherein subsequent to the storing, the device is configured to adjust the input display data using the color compensation profile for the input gray level when the display panel is providing a display. In such embodiments, the plurality of color channels may include red, green, and blue (RGB) color channels.

In some embodiments, the measuring may be performed by an image capturing device configured to measure the plurality of luminance values.

In some embodiments, the measuring of the plurality of luminance values, the selecting of the target luminance value, and the determining of the luminance compensation profile, may be performed for a given display brightness value (DBV) for the display panel.

In some embodiments, the input gray level may be below a threshold gray level, and the display panel may be operating at a brightness level below a threshold brightness level.

Figure 8:
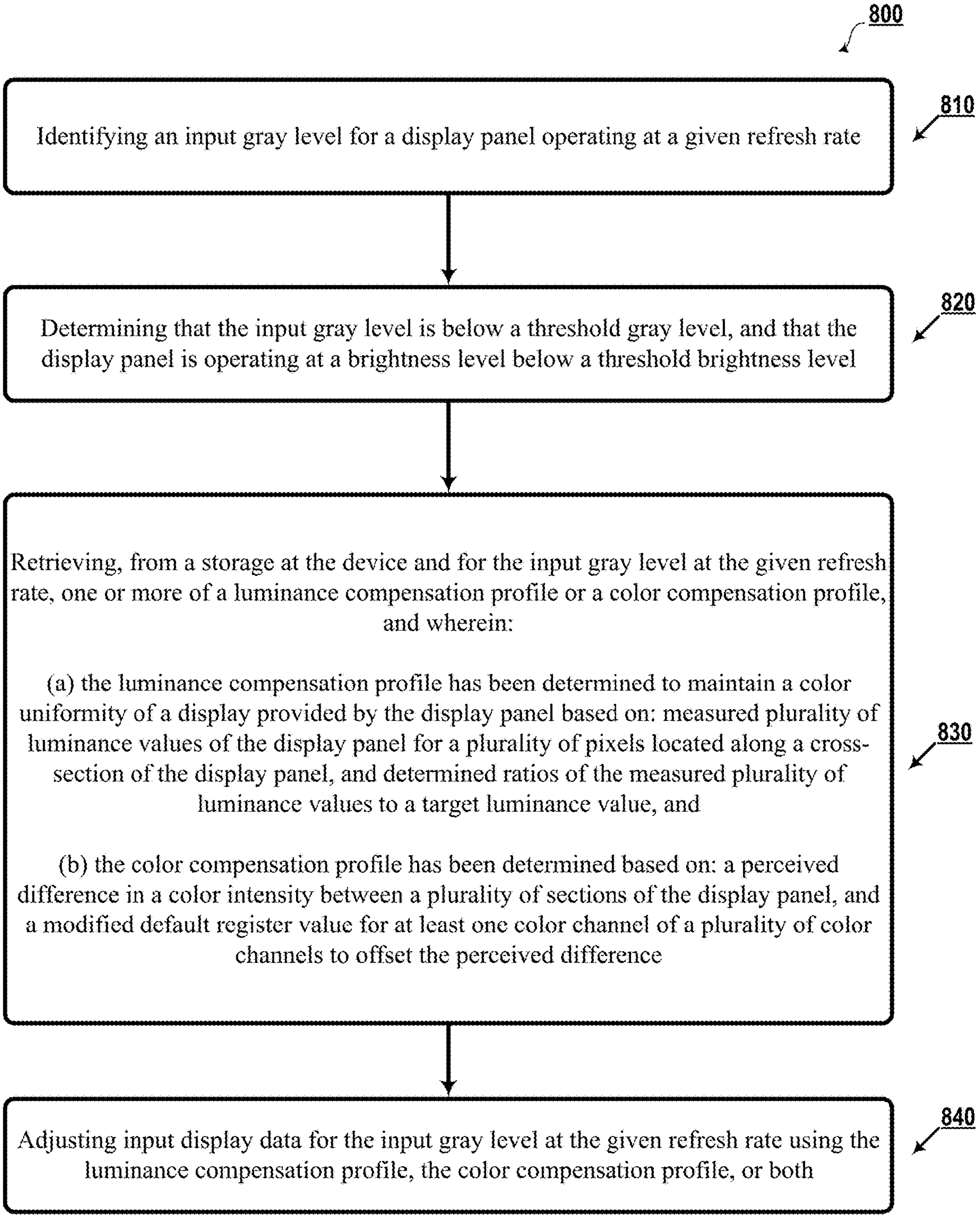
FIG. 8 illustrates another method, in accordance with example embodiments.

FIG. 8 illustrates a method 800, in accordance with example embodiments. Method 800 may include various blocks or steps. The blocks or steps may be carried out individually or in combination. The blocks or steps may be carried out in any order and/or in series or in parallel. Further, blocks or steps may be omitted or added to method 800.

The blocks of method 800 may be carried out by various elements of computing device 100 as illustrated and described in reference to FIG. 1. Furthermore, method 800 may utilize the relationships that are illustrated and described with regard to FIGS. 4A, 4B, 4C, 5, and 6.

Block 810 includes identifying an input gray level for a display panel operating at a given refresh rate.

Block 820 includes determining that the input gray level is below a threshold gray level, and that the display panel is operating at a brightness level below a threshold brightness level.

Block 830 includes retrieving, from a storage at the device and for the input gray level at the given refresh rate, one or more of a luminance compensation profile or a color compensation profile, and wherein (a) the luminance compensation profile has been determined to maintain a color uniformity of the display based on: measured plurality of luminance values of the display panel for a plurality of pixels located along a cross-section of the display panel, and determined ratios of the measured plurality of luminance values to a target luminance value, and (b) the color compensation profile has been determined based on: a perceived difference in a color intensity between a plurality of sections of the display panel, and a modified default register value for at least one color channel of a plurality of color channels to offset the perceived difference.

Block 840 includes adjusting input display data for the input gray level at the given refresh rate using the luminance compensation profile, the color compensation profile, or both.

Some embodiments include determining a histogram data for the display panel. The histogram data may include a pixel-wise distribution of color intensity of the display while the display panel of the device is operating at a given refresh rate. In such embodiments, the retrieving and the adjusting may be based on the histogram data.

In some embodiments, the display panel may include a plurality of zones. The histogram data may be based on the plurality of zones. In such embodiments, the retrieving and the adjusting is based on the plurality of zones. In such embodiments, the plurality of zones may include a top, middle, and bottom portion of the display panel. In some embodiments, the plurality of zones may be in alignment with the plurality of sections.

In some embodiments, the retrieving may include retrieving from a system on a chip (SoC).

In some embodiments, the display panel may be configured to operate at multiple refresh rates. Such embodiments include retrieving, from the storage at the device and based on the histogram data and for the input gray level at a second refresh rate different from the given refresh rate, a second luminance compensation profile. The second luminance compensation profile may have been determined based on: measured second plurality of luminance values of the display panel for the plurality of pixels located along the cross-section of the display panel, and determined ratios of the measured second plurality of luminance values to the target luminance value. Some embodiments also include adjusting the input display data for the input gray level at the second refresh rate using the second luminance compensation profile. Some embodiments additionally include transitioning, based on the adjusted input display data at the second refresh rate, the display panel from the given refresh rate to the second refresh rate.

Some embodiments include identifying a rate change triggering event while the display panel is operating at the given refresh rate. The transitioning of the display panel from the given refresh rate to the second refresh rate is performed in response to the identifying of the rate change triggering event.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods. Thus, the computer readable media may include secondary or persistent long-term storage, like read only memory (ROM), optical or magnetic disks, compact disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

measuring, from a device having a display panel and for an input gray level at a given refresh rate, a plurality of luminance values of the display panel for a plurality of pixels located along a cross-section of the display panel;

selecting, based on the measured plurality of luminance values, a target luminance value for the display panel;

determining a luminance compensation profile for the input gray level at the given refresh rate, wherein the luminance compensation profile comprises ratios of the measured plurality of luminance values to the target luminance value; and storing, at the device, the luminance compensation profile for the input gray level at the given refresh rate, wherein subsequent to the storing, the device is configured to adjust input display data using the luminance compensation profile for the input gray level when the display panel is providing a display, and wherein the luminance compensation profile maintains a color uniformity of the display.

2. The method of claim 1, further comprising:

determining, based on the luminance compensation profile and for the input gray level at the given refresh rate, modified luminance values for use by the device, wherein the modified luminance values maintain the color uniformity of the display.

3. The method of claim 1, wherein the storing comprises storing, on a system on a chip (SoC) and for a plurality of input gray levels and a plurality of refresh rates, a plurality of respective luminance compensation profiles.

4. The method of claim 1, wherein the cross-section is a longitudinal cross-section, and wherein the target luminance value corresponds to a luminance value from a central portion of the longitudinal cross-section.

5. The method of claim 1, wherein the display panel is configured to operate at multiple refresh rates, and the method further comprising:

measuring, from the device and for the input gray level at a second refresh rate different from the given refresh rate, a second plurality of luminance values of the display panel for a second plurality of pixels located along the cross-section of the display panel;

determining a second luminance compensation profile for the input gray level at the second refresh rate, wherein the second luminance compensation profile comprises products of the measured second plurality of luminance values with the ratios of the measured plurality of luminance values to the target luminance value; and storing, at the device, the second luminance compensation profile for the input gray level at the second refresh rate, wherein subsequent to the storing, the device is configured to adjust input display data using the second luminance compensation profile for the input gray level when the display panel is transitioning from the given refresh rate to the second refresh rate.

6. The method of claim 5, wherein the given refresh rate is 60 Hertz (Hz) and the second refresh rate is 90 Hz.

7. The method of claim 1, wherein the display panel has a plurality of color channels, and wherein the display panel comprises a partitioning into a plurality of sections, and the method further comprising:

determining a perceived difference in a color intensity between the plurality of sections;

determining, based on the perceived difference in the color intensity, a color compensation profile for the plurality of sections, wherein the color compensation profile modifies a default register value for at least one color channel of the plurality of color channels to offset the perceived difference in the color intensity; and storing, at the device, the color compensation profile for the input gray level at the given refresh rate, wherein subsequent to the storing, the device is configured to adjust the input display data using the color compensation profile for the input gray level when the display panel is providing a display.

8. The method of claim 7, wherein the plurality of color channels comprise red, green and blue (RGB) color channels.

9. The method of claim 1, wherein the measuring is performed by an image capturing device configured to measure the plurality of luminance values.

10. The method of claim 1, wherein the measuring of the plurality of luminance values, the selecting of the target luminance value, and the determining of the luminance compensation profile, is performed for a given display brightness value (DBV) for the display panel.

11. The method of claim 1, wherein the input gray level is below a threshold gray level, and the display panel is operating at a brightness level below a threshold brightness level.

12. A computer-implemented method comprising:

identifying an input gray level for a display panel operating at a given refresh rate;

determining that the input gray level is below a threshold gray level, and that the display panel is operating at a brightness level below a threshold brightness level;

retrieving, from a storage at the device and for the input gray level at the given refresh rate, one or more of a luminance compensation profile or a color compensation profile, and wherein:

(a) the luminance compensation profile has been determined to maintain a color uniformity of a display provided by the display panel based on:

measured plurality of luminance values of the display panel for a plurality of pixels located along a cross-section of the display panel, and determined ratios of the measured plurality of luminance values to a target luminance value, and (b) the color compensation profile has been determined based on:

a perceived difference in a color intensity between a plurality of sections of the display panel, and a modified default register value for at least one color channel of a plurality of color channels to offset the perceived difference; and adjusting input display data for the input gray level at the given refresh rate using the luminance compensation profile, the color compensation profile, or both.

13. The method of claim 12, further comprising:

determining a histogram data for the display, wherein the histogram data comprises a pixel-wise distribution of color intensity of the display while the display panel is operating at a given refresh rate, and wherein the retrieving and the adjusting is based on the histogram data.

14. The method of claim 12, wherein the display panel comprises a plurality of zones, and wherein the histogram data is based on the plurality of zones, and wherein the retrieving and the adjusting is based on the plurality of zones.

15. The method of claim 14, wherein the plurality of zones comprises a top, middle, and bottom portion of the display panel.

16. The method of claim 14, wherein the plurality of zones are in alignment with the plurality of sections.

17. The method of claim 12, wherein the retrieving comprises retrieving from a system on a chip (SoC).

18. The method of claim 12, wherein the display panel is configured to operate at multiple refresh rates, and the method further comprising:

retrieving, from the storage at the device and based on the histogram data and for the input gray level at a second refresh rate different from the given refresh rate, a second luminance compensation profile, wherein the second luminance compensation profile has been determined based on:

measured second plurality of luminance values of the display panel for the plurality of pixels located along the cross-section of the display panel, and determined ratios of the measured second plurality of luminance values to the target luminance value;

adjusting the input display data for the input gray level at the second refresh rate using the second luminance compensation profile; and transitioning, based on the adjusted input display data at the second refresh rate, the display panel from the given refresh rate to the second refresh rate.

19. The method of claim 18, further comprising:

identifying a rate change triggering event while the display panel is operating at the given refresh rate, and wherein the transitioning of the display panel from the given refresh rate to the second refresh rate is performed in response to the identifying of the rate change triggering event.

20. A system comprising:

one or more processors; and data storage, wherein the data storage has stored thereon computer-executable instructions that, when executed by the one or more processors, cause the system to carry out operations comprising:

identifying an input gray level for a display panel operating at a given refresh rate;

determining that the input gray level is below a threshold gray level, and that the display panel is operating at a brightness level below a threshold brightness level;

retrieving, from a storage at the device and for the input gray level at the given refresh rate, one or more of a luminance compensation profile or a color compensation profile, and wherein:

(a) the luminance compensation profile has been determined to maintain a color uniformity of a display provided by the display panel based on:

measured plurality of luminance values of the display panel for a plurality of pixels located along a cross-section of the display panel, and determined ratios of the measured plurality of luminance values to a target luminance value, and (b) the color compensation profile has been determined based on:

a perceived difference in a color intensity between a plurality of sections of the display panel, and a modified default register value for at least one color channel of a plurality of color channels to offset the perceived difference; and adjusting input display data for the input gray level at the given refresh rate using the luminance compensation profile, the color compensation profile, or both.

* * * * *